(12) United States Patent
Omori et al.

(10) Patent No.: US 7,489,601 B2
(45) Date of Patent: Feb. 10, 2009

(54) DISK DRIVE

(75) Inventors: Kiyoshi Omori, Tokyo (JP); Masayasu Ito, Chiba (JP); Aki Yoguchi, Tokyo (JP); Kouji Shinohara, Chiba (JP); Akio Ishiwata, Chiba (JP); Masaki Nagatsuka, Chiba (JP); Toshikazu Kobayashi, Tokyo (JP); Satoshi Mimura, Kanagawa (JP); Satoshi Muto, Chiba (JP); Toshisada Takada, Chiba (JP)

(73) Assignees: Sony Computer Entertainment, Inc., Tokyo (JP); Sony Corporation, Tokyo (JP)

( * ) Notice: Subject to any disclaimer, the term of this patent is extended or adjusted under 35 U.S.C. 154(b) by 685 days.

(21) Appl. No.: 10/959,950

(22) Filed: Oct. 6, 2004

(65) Prior Publication Data

US 2005/0132393 A1 Jun. 16, 2005

(30) Foreign Application Priority Data

Oct. 6, 2003 (JP) ............................. 2003-347673

(51) Int. Cl.
*G11B 7/00* (2006.01)
(52) U.S. Cl. ................................. 369/44.14; 369/44.32
(58) Field of Classification Search ................ 369/53.1, 369/53.11, 53.25, 53.31, 53.36, 13.28, 34.01; 720/663, 669, 670, 672–679
See application file for complete search history.

(56) References Cited

U.S. PATENT DOCUMENTS

| | | | | |
|---|---|---|---|---|
| 5,848,049 A | * | 12/1998 | Yokota et al. | ................ 720/670 |
| 6,141,312 A | * | 10/2000 | Masters et al. | ................ 369/97 |
| 6,421,196 B1 | * | 7/2002 | Takayama et al. | ............. 360/71 |
| 7,188,349 B2 | * | 3/2007 | Ezawa et al. | ................ 720/669 |
| 7,260,041 B2 | * | 8/2007 | Ezawa et al. | ............... 369/53.2 |
| 7,310,295 B2 | * | 12/2007 | Miyake | ................... 369/53.19 |

FOREIGN PATENT DOCUMENTS

| | | |
|---|---|---|
| JP | 62-270088 | 11/1987 |
| JP | 63-269336 | 11/1988 |
| JP | 03-062369 | 3/1991 |
| JP | 04-181525 | 6/1992 |

(Continued)

OTHER PUBLICATIONS

Translation of JP 06131681 A.*

*Primary Examiner*—Paul Huber
(74) *Attorney, Agent, or Firm*—Wolf, Greenfield & Sacks, P.C.

(57) ABSTRACT

There is provided a disk drive including a base chassis, a first optical pickup mechanism including a disk rotation drive disposed on the base chassis, first optical pickup unit to write and/or read data to and/or from a first optical disk and a first pickup moving mechanism to move the first optical pickup unit radially of the first optical disk, a second optical pickup mechanism disposed opposite to the first optical pickup mechanism and including a second optical pickup unit to write and/or read data to and/or from a second optical disk and a second pickup moving mechanism to move the second optical pickup unit radially of the second optical disk, and a controlling means for detecting the movement of one of the optical pickup units and moving the other optical pickup unit to make weight balancing of the base chassis. Thus, the base chassis weight is balanced while one of the two optical pickup units is being moved.

8 Claims, 8 Drawing Sheets

FOREIGN PATENT DOCUMENTS

| | | |
|---|---|---|
| JP | 5-250675 | 9/1993 |
| JP | 06131681 A * | 5/1994 |
| JP | 6-162554 | 6/1994 |
| JP | 09-017155 | 1/1997 |
| JP | 09-017156 | 1/1997 |
| JP | 09-017157 | 1/1997 |
| JP | 09-282671 | 10/1997 |
| JP | 09-282672 | 10/1997 |
| JP | 10-64092 | 3/1998 |
| JP | 10-0269579 | 10/1998 |
| JP | 11-328705 | 11/1999 |
| JP | 2001-148130 | 5/2001 |
| JP | 2001-155342 | 6/2001 |
| JP | 2002-109768 | 4/2002 |
| JP | 2002-269768 | 9/2002 |
| JP | 2003-67920 | 3/2003 |
| JP | 2003-217226 | 7/2003 |

* cited by examiner

DISK DRIVE

BACKGROUND OF THE INVENTION

1. Field of the Invention

The present invention relates to a disk drive including an optical pickup for playing an optical disk and an optical pickup for writing or reading information signals to or from the optical disk.

This application claims the priority of the Japanese Patent Application No. 2003-347673 filed on Oct. 6, 2003, the entirety of which is incorporated by reference herein.

2. Description of the Related Art

There has been proposed an optical disk drive including two optical pickups, one of which is to play a CD (compact disk), CD-R, CD-ROM or the like and the other of which is to play a DVD (digital versatile disk) (cf. the Japanese Patent Application Laid Open Nos. H09-282671 and H09-282672). The disk drive includes a device body and a sub chassis disposed inside the device body, and has disposed on the sub chassis a disk rotation drive to rotate each of various types of disk-shaped recording media while holding it, first pickup unit to read information signals or the like from a DVD, second pickup unit to play a CD, CD-R or CD-ROM and a skew adjusting mechanism to adjust an inclination of the first and second pickup units.

The sub chassis is formed generally rectangular, and has a damping member formed from rubber or the like provided near each corner thereof. The sub chassis is disposed inside the device body with the damping members laid between them, and thus it is isolated from vibration. Also, on the sub chassis, there are provided the disk rotation drive disposed nearly at the center, and the first and second pickup units disposed opposite to each other across the disk rotation drive or at a predetermined angle defined between them.

The disk rotation drive to hold each of various types of disk-shaped recording media rotatably includes a disk table on which the disk-shaped recording medium is place, and a spindle motor with a spindle shaft to which the disk table is fixed. The disk rotation drive rotates the disk-shaped recording medium set on the disk table at a constant linear velocity or angular velocity. The disk rotation drive is disposed nearly at the center of the sub chassis.

The first pickup unit to play a DVD is supported on a pair of guide shafts provided in parallel to the length of the sub chassis, and can freely be moved by a pickup moving mechanism radially of the DVD. Also, the first pickup unit includes a pickup having a semiconductor laser that emits a laser beam of 650 or 635 nm in wavelength, and a skew sensor.

The second pickup unit to play a CD, CD-R or CD-ROM is supported on the pair of guide shafts provided in parallel to the length of the sub chassis, and can freely be moved by a pickup moving mechanism radially of a CD or the like. Also, the second pickup unit includes a pickup having a semiconductor laser that emits a laser beam of 780 nm in wavelength.

In the disk drive, when a disk-shaped recording medium is held on the disk table, its type is detected and either the first or second pickup unit is selected which is suitable for the specifications of the recording medium. Then, the first or second pickup unit selected correspondingly to the type of the disk-shaped recording medium set on the disk table is activated to emit a laser beam having a predetermined wavelength for reading information signals from the recording medium. Also, an inclination of the reading laser beam is detected by the skew sensor provided on the first pickup unit with reference to a skew detection hole, and one of the guide shafts in pair is driven by the skew adjusting mechanism. Thus, each pickup in the first or second pickup unit supported on the pair of guide shafts has the inclination of an objective lens thereof adjusted for adjustment of a skew.

In such a disk drive, the pair of guide shafts is provided to extend over the sub chassis and the first and second pickup units supported on the pair of guide shafts are disposed on the same sub chassis, so that the first and second pickup units can have the height thereof defined accurately. Therefore, the disk drive can accurately position the disk-shaped recording medium without any troublesome positional adjustment of the first and second pickup units in relation to the disk-shaped recording medium.

In the above disk drive, however, either the first or second optical pickup unit is selected correspondingly to the type of a disk-shaped recording medium inserted in the device body, the pickup in the selected one of the optical pickup units is moved radially of the disk-shaped recording medium. At this time, the pickup in the other optical pickup unit not selected is positioned at the inner or outer radius of the disk-shaped recording medium. Therefore, if the pickup in the selected optical pickup unit moves to the outer or inner radius of the disk-shaped recording medium, the weight of the sub chassis will be imbalanced.

More specifically, the disk drive has the disk rotation drive provided generally at the center of the sub chassis and the first and second pickup units provided in positions opposite to each other across the disk rotation drive so that when each of the pickups in the first and second pickup units is in an initial position at the outer or inner radius of a disk-shaped recording medium, the center of gravity of the sub chassis will come to the disk rotation drive including the spindle motor which will be a source of vibration. However, when one of the optical pickup units, selected correspondingly to the type of a disk-shaped recording medium set in place, is moved, the weight balance of the sub chassis will be lost.

Thus, the center of gravity of the sub chassis will be off the spindle motor which is the source of vibration, vibration isolation will be lost, disk-shaped recording medium cannot be rotated stably, and no skew can be detected accurately.

Also, there have recently been prevailing disk drives capable of reading information signals from a disk-shaped recording medium such as a DVD and also writing information signals to the recording medium. Such a disk drive is required to have a capability of detecting and correcting an inclination of the optical axis of a laser beam in relation to the disk-shaped recording medium in which the recording track pitch is small, such as a DVD, with a higher accuracy than that in a disk drive which plays a CD or the like.

Also, the distance between an optical disk and skew sensor always varies since it depends upon the type of a disk-shaped recording medium such as CD, DVD or the like, state in which the disk-shaped recording medium is chucked to the disk table, warp of the disk-shaped recording medium and so forth. On this account, skew detection and adjustment are always done while the disk-shaped recording medium is being rotated, for an accurate skew detection of the skew sensor.

In the aforementioned disk drive, however, a pair of guide shafts is provided to extend on one sub chassis, a first pickup unit dedicated for CD and second pickup unit dedicated for DVD are supported on the guide shafts, respectively, and skew of these first and second pickup units is adjusted through adjustment of an inclination of the guide shaft. Thus, it is difficult to make an accurate, real-time skew adjustment while the disk-shaped recording medium is being rotated.

Also, there have recently been prevailing disk drives capable of reading information signals from a disk-shaped recording medium such as a DVD and also writing information signals to the recording medium. Such a disk drive is required to have a capability of accurately detecting the type of a disk-shaped recording medium set in place in order to define a write or read format, and writing or reading information signals to or from the disk-shaped recording medium in a format corresponding to the detected type of the disk-shaped recording medium.

Also, there have recently been prevailing disk drives capable of reading information signals from a disk-shaped recording medium such as a DVD and also writing information signals to the recording medium. Such a disk drive is designed to write or read information signals to or from a disk-shaped recording medium whose recording track pitch is small, such as a DVD, by having a laser beam in a predetermined format corresponding to the type of the inserted disk-shaped recording medium track a recording track on the latter while accurately controlling tracking and focusing in relation to the disk-shaped recording medium.

Conventionally, to verify whether information signals have normally been written to such a high recording-density disk-shaped recording medium, an optical pickup unit used for writing information signals is used to read information signals. Therefore, since the information signals are read after writing the information signals, the verification cannot be done rapidly.

Also, in the conventional disk drive, since a disk-shaped recording medium is to be carried along the length of a sub chassis, so it has to be carried over a long distance from a disk slot in a device body to a disk table. Also, the disk transport mechanism to carry a disk-shaped recording medium along the length of the sub chassis is considerably large. Further, because of the long carrying distance, it will take a considerably long time to inset or eject the disk-shaped recording medium.

Also, in case the disk-shaped recording medium is to be carried on a disk tray, the disk tray should have formed therein openings through which first and second optical pickup units can be exposed to the signal recording surface of the disk recording medium within a range between the inner and outer radii of the latter. The openings have to be formed opposite to each other across the center of a disk mount. Therefore, the rigidity of the disk tray cannot be assured and also the disk tray should be produced by a complicated process.

Also, in the conventional disk drive, a damping member to isolate a sub chassis from vibration is provided near each corner of the sub chassis, and a spindle motor as a source of vibration is disposed nearly at the center of the sub chassis. Therefore, the damping member is so separated from the source of vibration that it cannot effectively absorb vibration from the spindle motor. Also, the damping member is provided near each corner of the sub chassis. As the first or second optical pickup unit is moved to the inner radius of a disk-shaped recording medium and thus approaches the spindle motor as the source of vibration, the damping member will be separated from the first or second optical pickup unit. Thus, write or read of information signals will possibly be adversely affected by the vibration of the spindle motor.

OBJECT AND SUMMARY OF THE INVENTION

It is therefore an object of the present invention to overcome the above-mentioned drawbacks of the related art by providing a disc drive including two optical pickup units and capable of making weight balancing of the whole device while one of the optical pickup devices is being driven.

The above object can be attained by providing a disk drive including according to the present invention:
a base chassis;
a disk rotation drive including a disk table disposed on the base chassis to hold a disk-shaped recording medium and a spindle motor coupled to the disk table to rotate the latter;
a first optical pickup mechanism including a first optical pickup unit disposed on the base chassis to write and/or read information signals to and/from a first disk-shaped recording medium set on the disk table, and a first pickup moving mechanism that moves the first optical pickup unit radially of the first disk-shaped recording medium;
a second optical pickup mechanism including a second optical pickup unit disposed opposite to the first optical pickup mechanism to write and/or read information signals to and/or from a second disk-shaped recording medium set on the disk table, and a second pickup moving mechanism that moves the second optical pickup unit radially of the second disk-shaped recording medium; and
a controlling means for making weight balancing of the base chassis by detecting a distance over which one of the first and second optical pickup units has been moved and moving the other optical pickup unit radially of the first or second disk-shaped recording medium synchronously with the one optical pickup unit.

In the above disk drive according to the present invention, since one of the first and second optical pickup units disposed opposite to each other on the base chassis is moved toward the inner or outer radius of the first or second disk-shaped recording medium while the other optical pickup unit is moved toward the inner or outer radius of the first or second disk-shaped recording medium synchronously with the movement of the one optical pickup unit, the movement of the other optical pickup will counterbalance a change in weight balance of the base chassis, caused by the movement of the one optical pickup unit. Therefore, even if the first or second optical pickup unit has been moved to any position between the inner and outer radii of the first or second disk-shaped recording medium, the center of gravity of the base chassis will not be off the disk rotation drive as a source of vibration, whereby the first or second disk-shaped recording medium can be kept stably rotated without any axial deflection. Also, because the first or second disk-shaped recording medium is rotated stably, the first or second optical pickup unit can write or read content data positively.

It is another object of the present invention to provide a disk drive including two pickup units corresponding to different types of disk-shaped recording media and capable of making an accurate, real-time skew adjustment.

The above object can be attained by providing a disk drive including according to the present invention:
a base chassis;
a disk rotation drive including a disk table disposed on the base chassis to hold a disk-shaped recording medium and a spindle motor coupled to the disk table to rotate the latter;
a first optical pickup mechanism including a first optical pickup unit disposed on the base chassis to only read information signals recorded in a first disk-shaped recording medium set on the disk table, and a first pickup moving mechanism that moves the first optical pickup unit radially of the first disk-shaped recording medium;
a first skew adjusting means for adjusting a skew of the first optical pickup unit correspondingly to an inclination of the first optical pickup unit;
a second optical pickup mechanism including a second optical pickup unit disposed opposite to the first optical pickup mechanism to write and/or read information signals to and/or from a second disk-shaped recording medium set on the disk table, and a second pickup moving mechanism that moves the second optical pickup unit radially of the second disk-shaped recording medium;

a skew detecting means for detecting an inclination of the optical axis of light emitted from the second optical pickup unit in relation to the second disk-shaped recording medium; and a second skew adjusting means for adjusting a skew of the second optical pickup unit writing or reading information signals to or from the second disk-shaped recording medium by adjusting an inclination of the second optical pickup unit correspondingly to the optical axis inclination detected by the skew detecting means.

The above disk drive according to the present invention includes the first optical pickup unit to only read information signals from the first disk-shaped recording medium, second optical pickup unit to write and/or read information signals to and/or from the second disk-shaped recording medium, and the first and second skew adjusting mechanisms to make a skew adjustment of the first and second optical pickup units, and can thus make an accurate, real-time skew adjustment of the second optical pickup unit during reading or writing information signals from or to the second disk-shaped recording medium. Therefore, the two optical pickup units and skew adjusting mechanisms can selectively be used correspondingly to the type of a disk-shaped recording medium inserted in the device to write or read content data at an appropriate skew angle.

It is another object of the present invention to provide a disk drive including two optical pickup units corresponding to different types of disk-shaped recording medium and which writes or reads information signals, in which the type of a disk-shaped recording medium inserted in the device body can be detected with a high accuracy.

The above object can be attained by providing a disk drive including according to the present invention:

a base chassis;

a disk rotation drive including a disk table disposed on the base chassis to hold a disk-shaped recording medium and a spindle motor coupled to the disk table to rotate the latter;

a first optical pickup mechanism including a first optical pickup unit disposed on the base chassis to read information signals from a first disk-shaped recording medium set on the disk table, and a first pickup moving mechanism that moves the first optical pickup unit radially of the first disk-shaped recording medium;

a first skew adjusting means for adjusting a skew of the first optical pickup unit correspondingly to an inclination of the optical axis in relation to the disk-shaped recording medium;

a second optical pickup mechanism including a second optical pickup unit disposed opposite to the first optical pickup mechanism to write and/or read information signals to and/or from a second disk-shaped recording medium set on the disk table, and a second pickup moving mechanism that moves the second optical pickup unit radially of the second disk-shaped recording medium;

a skew detecting means for detecting an inclination of the optical axis of light emitted from the second optical pickup unit in relation to the second disk-shaped recording medium;

a second skew adjusting means for adjusting a skew by adjusting an inclination of the second optical pickup unit correspondingly to an inclination of the optical axis, detected by the skew detecting means; and a detecting means for detecting the type of a disk-shaped recording medium inserted by the second optical pickup unit into the device body.

In the above disk drive, the second optical pickup unit is used to write or read information signals to or from various types of disk-shaped recording media, and the skew detecting means and skew adjusting means accurately correct an inclination of the optical axis of a laser beam projected onto the signal recording surface having a very small physical format including a track pitch, pit, etc. Therefore, using the second optical pickup unit to detect the type of a disk-shaped recording medium, it is possible to distinguish between disks through accurate detection of identification data recorded on the signal recording surface.

It is another object of the present invention to provide a disk drive including two optical pickup units corresponding to a plurality of types of disk-shaped recording medium and which writes or reads information signals, in which the type of a disk-shaped recording medium inserted in the device body can be detected by one of the optical pickup units that is used less frequently, thereby permitting to assure a longer service life of the entire device.

The above object can be attained by providing a disk drive including according to the present invention:

a base chassis;

a disk rotation drive including a disk table disposed on the base chassis to hold a disk-shaped recording medium and a spindle motor coupled to the disk table to rotate the latter;

a first optical pickup mechanism including a first optical pickup unit disposed on the base chassis to read information signals from a first disk-shaped recording medium set on the disk table, and a first pickup moving mechanism that moves the first optical pickup unit radially of the first disk-shaped recording medium;

a first skew adjusting means for adjusting a skew of the first optical pickup unit correspondingly to an inclination of the optical axis in relation to the disk-shaped recording medium;

a second optical pickup mechanism including a second optical pickup unit disposed opposite to the first optical pickup mechanism to write and/or read information signals to and/or from a second disk-shaped recording medium set on the disk table, and a second pickup moving mechanism that moves the second optical pickup unit radially of the second disk-shaped recording medium;

a skew detecting means for detecting an inclination of the optical axis of light emitted from the second optical pickup unit in relation to the second disk-shaped recording medium;

a second skew adjusting means for adjusting a skew by adjusting an inclination of the second optical pickup unit correspondingly to an inclination of the optical axis, detected by the skew detecting means; and a detecting means for detecting the type of a disk-shaped recording medium inserted by the first optical pickup unit into the device body.

In the above disk drive, the first optical pickup unit is used to only read data from the disk-shaped recording medium and less frequently than the second optical pickup unit which is used to write and/or read data to and/or from the disk-shaped recording medium. Therefore, the first optical pickup unit is used to detect the type of a disk-shaped recording medium inserted in the device body, thereby permitting to reduce the load to the frequently used second optical pickup unit and thus assure a longer service life of the entire device.

It is another object of the present invention to provide a disk drive including two optical pickup units corresponding to a plurality of types of disk-shaped recording medium and which writes or reads information signals, in which it can be verified rapidly whether the information signals have successfully been written to a disk-shaped recording medium.

The above object can be attained by providing a disk drive including according to the present invention:

a base chassis;

a disk rotation drive including a disk table disposed on the base chassis to hold a disk-shaped recording medium and a spindle motor coupled to the disk table to rotate the latter;

a first optical pickup mechanism including a first optical pickup unit disposed on the base chassis to write and/or read information signals to and/or from a first disk-shaped recording medium set on the disk table, and a first pickup moving mechanism that moves the first optical pickup unit radially of the first disk-shaped recording medium;

a second optical pickup mechanism including a second optical pickup unit disposed opposite to the first optical pickup mechanism to write and/or read information signals to and/or from a second disk-shaped recording medium set on the disk table, and a second pickup moving mechanism that moves the second optical pickup unit radially of the second disk-shaped recording medium; and a detecting means for detecting whether the first optical pickup unit has successfully written information signals to the disk-shaped recording medium while the second optical pickup unit is wiring the information signals to the disk-shaped recording medium.

In the above disk drive, there are provided the first and second optical pickup units, and it is possible to rapidly detect any write error and retry a write through simultaneous verification of whether the first and second optical pickup units have successfully written. Therefore, this disk drive can write data, and retry to write data, to a disk-shaped recording medium more rapidly than a disk drive including a single optical pickup unit and in which write error is detected by the optical pickup unit after completion of data write.

It is another object of the present invention to provide a disk drive in which the distance over which a disk-shaped recording medium is carried is so short as to rapidly insert or eject the disk-shaped recording medium.

The above object can be attained by providing a disk drive including according to the present invention:

a device body having formed at the front side thereof a disk slot through which a disk-shaped recording medium is inserted;

a base chassis formed generally rectangular and disposed inside the device body for the length thereof to be parallel to the front of the device body;

a disk rotation drive including a disk table disposed nearly at a longitudinal middle of the base chassis to hold a disk-shaped recording medium and a spindle motor coupled to the disk table to rotate the latter;

a first optical pickup mechanism including a first optical pickup unit disposed on the base chassis to write and/or read information signals to and/or from a first disk-shaped recording medium set on the disk table, and a first pickup moving mechanism that moves the first optical pickup unit from near the longitudinal middle of the base chassis to one end of the latter; and a second optical pickup mechanism including a second optical pickup unit disposed opposite to the first optical pickup mechanism to write and/or read information signals to and/or from a second disk-shaped recording medium set on the disk table, and a second pickup moving mechanism that moves the second optical pickup unit from near the longitudinal middle of the base chassis to the other end of the latter, the disk-shaped recording medium being carried in a direction perpendicular to a moving direction of the first or second optical pickup unit.

In the above disk drive, the base chassis is disposed for the length thereof to be parallel to the front of the device body, and the disk-shaped recording medium inserted through the disk slot is carried in the direction perpendicular to the longitudinal direction of the base chassis in which the first and second optical pickup units are moved. Therefore, in the disk drive according to the present invention, the distance over which the disk-shaped recording medium is carried to the disk rotation drive is shorter than that in a conventional disk drive in which a disk-shaped recording medium is carried in the longitudinal direction of the base chassis in which the optical pickup unit is moved. Therefore, the disk-shaped recording medium can be loaded and unloaded more rapidly. Also, because of this reduced distance over which the disk-shaped recording medium is to be carried, the disk carrying means may be designed more compact.

It is another object of the present invention to provide a disk drive having two optical pickup units disposed opposite to each other across a spindle motor which will be a source of vibration, in which it is possible to effectively suppress the vibration from the spindle motor, thereby limiting the influence of the vibration on the write or read of information signals to or from a recording medium.

The above object can be attained by providing a disk drive including according to the present invention:

a base frame;

a base chassis formed generally rectangular and installed on the base frame;

a disk rotation drive including a disk table disposed nearly at a longitudinal middle of the base chassis to hold a disk-shaped recording medium and a spindle motor coupled to the disk table to rotate the latter;

a first optical pickup mechanism including a first optical pickup unit disposed at one longitudinal end of the base chassis to write and/or read information signals to and/or from a first disk-shaped recording medium set on the disk table, a pair of first guide shafts extending from near the longitudinal middle of the base chassis to one end of the latter to guide the first optical pickup unit in moving over the disk-shaped recording medium between the inner and outer radii of the latter, and a first pickup moving mechanism that moves the first optical pickup unit along the pair of first guide shafts; and a second optical pickup mechanism including a second optical pickup unit disposed opposite to the first optical pickup mechanism to write and/or read information signals to and/or from a second disk-shaped recording medium set on the disk table, a pair of second guide shafts extending from near the longitudinal middle of the base chassis to the other end of the latter to guide the second optical pickup unit in moving over the disk-shaped recording medium between the inner and outer radii of the latter, and a second pickup moving mechanism that moves the second optical pickup unit along the pair of second guide shafts, the base chassis having a pair of first damping members at each outer side of the first and second guide shafts which guide the disk-shaped recording medium in moving between the inner and outer radii of the latter and also a pair of second guide shafts at the inner sides of the first and second guide shafts.

In the above disk drive, when the first and second optical pickup units are moved to the inner radius of the disk-shaped recording medium in which direction they are nearer to the spindle motor as a source of vibration, they are enclosed along with the vibration-source spindle motor with the first and second damping members, whereby it is possible to effectively prevent the optical pickup units from being influenced by the vibration of the spindle motor. Also, when the first and second optical pickup units are moved to the outer radius of the disk-shaped recording medium in which direction they are away from the vibration-source spindle motor, they are enclosed with three damping members including a pair of first damping members and at least a second damping member. Thus, the optical pickup units can be prevented from being adversely affected by the vibration of the spindle motor.

These objects and other objects, features and advantages of the present invention will become more apparent from the following detailed description of the preferred embodiments of the present invention when taken in conjunction with the accompanying drawings.

DETAILED DESCRIPTION OF THE PREFERRED EMBODIMENTS

The present invention will be described in detail concerning the embodiments thereof with reference to the accompanying drawings.

Figure 1:
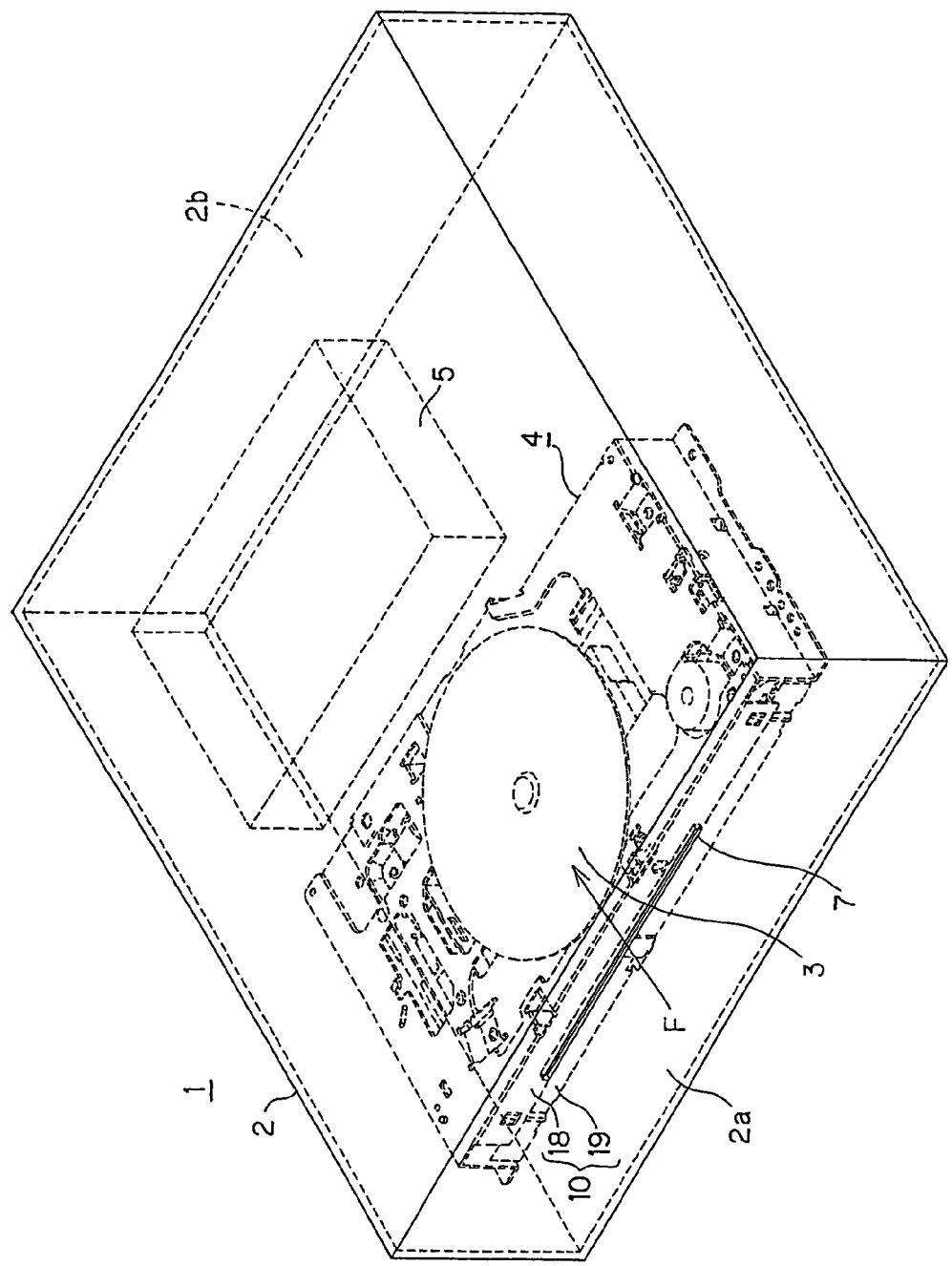
FIG. 1 is a perspective view of the disk drive according to the present invention.

The disk drive according to the present invention, generally indicated with a reference 1, is to write and/or read information signals to and/or from a plurality of disk-shaped recording media such as a CD, DVD, etc. As shown in FIG. 1, it includes a device body 2 having provided therein a write/read unit 4 that holds any one of a plurality of types of disk-shaped recording media 3 such as a CD, DVD, etc. rotatably and writes and/or read content data to and/or from the disk-shaped recording medium 3, and a hard disk drive 5 that holds an operating system (OS), browsing software, electronic mail program, communications protocol, various application programs, audio data, movie data, etc.

In the disk drive 1, the read-only disk-shaped recording medium 3 such as a CD, DVD or the like is set in the write/read unit 4, and content data such as recorded game software, application program, video data, audio data, etc. are read from the disk-shaped recording medium 3 and supplied as output signals to a monitor device such as a television set. Also, in the disk drive 1, a writable disk-shaped recording medium 3 such as CD-R, DR-RW, DVD-R, DVD-RAM, DVD+RW, DVD-RW or the like is set in the write/read unit 4, and content data such as an application program, video data, audio data, etc. stored in a memory such as the hard disk drive 5 are written to the disk-shaped recording medium 3 set in the write/read unit 4. The content data can thus be stored in the disk-shaped recording medium 3.

Also, the disk drive 1 includes two optical pickup mechanisms as will be described later. The first one of the optical pickup mechanisms is used to only read a first disk-shaped recording medium 3a having various content data recorded therein in a first format, and the second optical pickup mechanism is used to read a second disk-shaped recording medium 3b having various content data recorded therein in a second format and write various content data in the second format to the second disk-shaped recording medium 3b.

In the disk drive 1, the write/read unit 4 is disposed at the front side 2a of the device body 2, and the hard disk drive 5, power unit (not shown), etc. are disposed at the rear side 2a. At the front side 2a of the device body 2, there is formed a disk slot 7 through which the disk-shaped recording medium 3 to be loaded into the write/read unit 4 is inserted and ejected. The disk-shaped recording medium 3 inserted from the disk slot 7 is carried by a carrying mechanism (not shown) to the rear side 2b of the device body 2, and loaded into the write/read unit 4. After completion of write or read of content data to or from the disk-shaped recording medium 3, the latter is carried by the carrying mechanism to the front side 2a of the device body 2 and ejected through the disk slot 7.

Note that the carrying mechanism to carry the disk-shaped recording medium 3 into or out of the device body 2 through the disk slot 7 is provided near the disk slot 7 and it includes a pair of conveying rollers extending toward the surface of the disk-shaped recording medium 3 or toward both sides of the disk-shaped recording medium 3, a supporting member extending from the front side 2a of the device body 2 to the rear side 2b to support the disk-shaped recording medium 3 at the outermost-peripheral top and bottom or edge and guide the disk-shaped recording medium 3 in moving inside the device body 2, and a push-out member to push out the disk-shaped recording medium 3 to the disk slot 7 at the time of ejection. When the disk-shaped recording medium 3 inserted in the disk slot 7 is detected, the conveying rollers are rotated while holding the disk-shaped recording medium 3 between them at the top and bottom sides or side edge to carry the disk-shaped recording medium 3 to the rear side 2b of the device body 2. Also, for ejection of the disk-shaped recording medium 3, the push-out member pushes out the disk-shaped recording medium 3 to the front side 2a and are rotated while holding the disk-shaped recording medium 3 between them, thereby ejecting the disk-shaped recording medium 3 to outside the disk slot 7.

Figure 2:
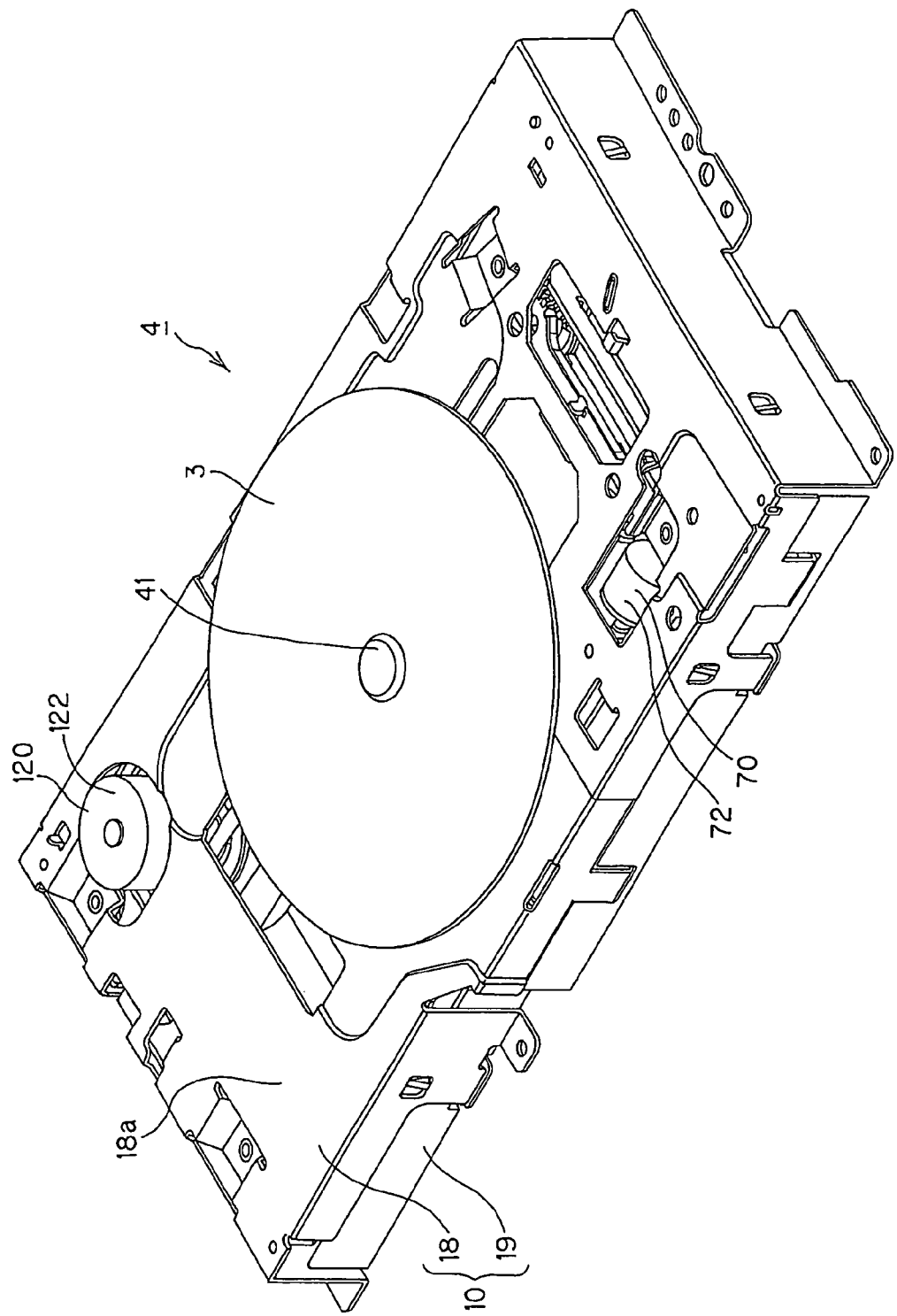
FIG. 2 is a perspective view of the write/read unit.
Figure 3:
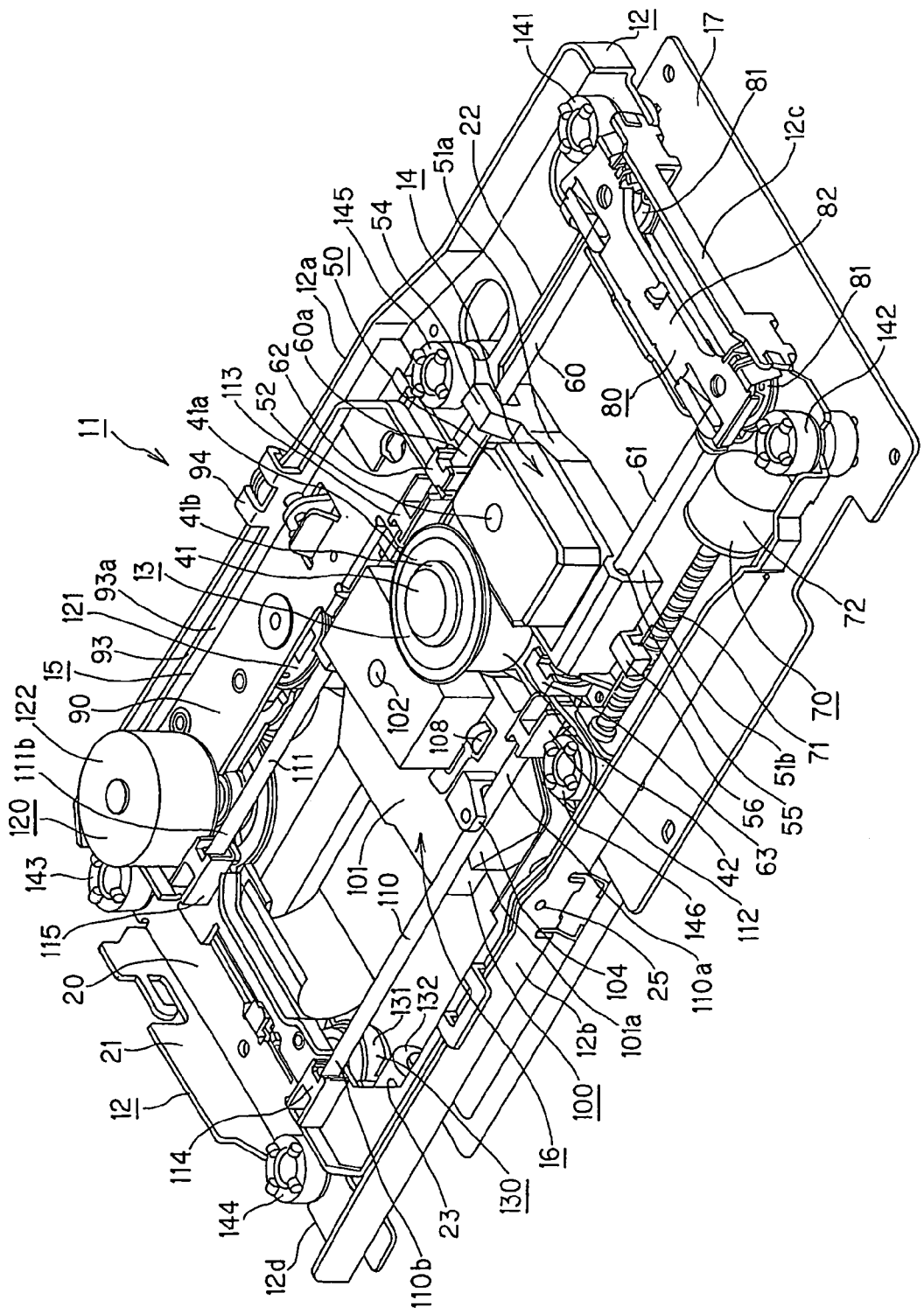
FIG. 3 is a perspective view of the write/read mechanism included in the write/read unit.

Next, the write/read unit 4 to write and/or read content data to and/or from the disk-shaped recording medium 3 will be explained with reference to FIGS. 2 and 3. FIGS. 2 and 3 are perspective views, respectively, from the rear side 2b of the device body 2, of the write/read unit 4.

As shown in FIG. 2, the write/read unit 4 includes a base frame 10, as a unit housing, composed of a pair of upper and lower frames, and a write/read mechanism 11 housed in the base frame 10. As shown in FIG. 3, the write/read mechanism 11 includes a base chassis 12 on which various components are provided, a disk rotation drive 13 provided on the base chassis 12 to rotate the disk-shaped recording medium 3, a first optical pickup mechanism 14 provided on the base chassis 11 to read content data from the disk-shaped recording medium 3, a sub chassis 15 provided on the base chassis 12, and a second optical pickup mechanism 16 provided on the sub chassis 15 to write and/or read content data to and/or from the disk-shaped recording medium 3.

The base frame 10 is formed from the upper and lower frames 18 and 19 to provide a housing for the write/read unit 4 and house the write/read mechanism 11 in it. The upper frame 18 of the base frame 10 has formed therein an opening through which a disk table of the disk rotation drive 13, which will be described in detail later, is projected from an upper side 18a of the upper frame 18. In the base frame 10, the disk-shaped recording medium 3 loaded on the disk table projected out from the upper side 18a of the upper frame 18 is held rotatably on the upper side 18a of the upper frame 18. Also, the lower frame 19 of the base frame 10 has disposed thereon the base chassis 12 of the write/read mechanism 11 and a circuit board 17 on which a drive circuit of the write/read mechanism 11 and the like are formed.

Figure 4:
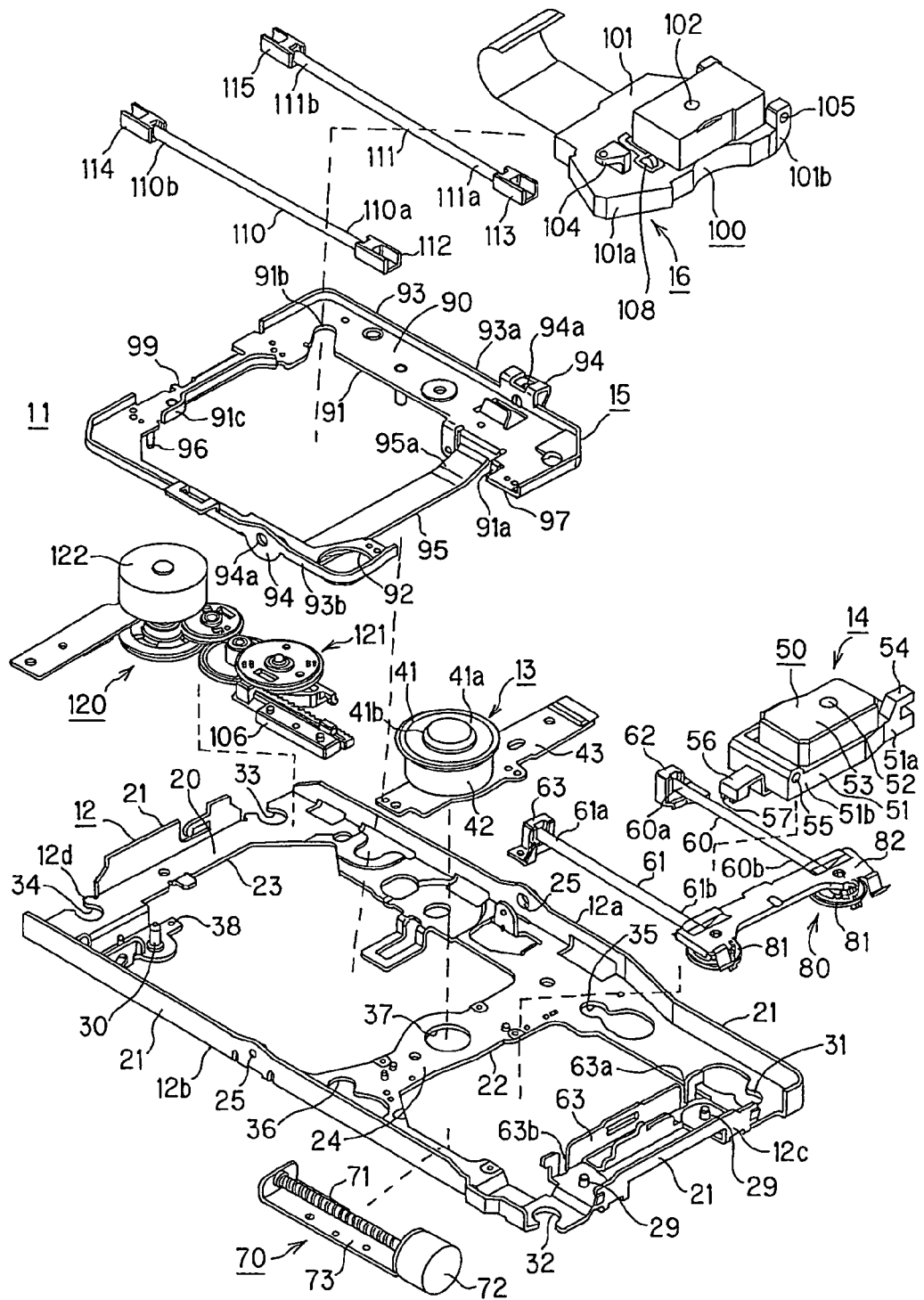
FIG. 4 is an exploded perspective view of the write/read mechanism.

As shown in FIGS. 3 and 4, the base chassis 12 of the write/read mechanism 11, housed in the base frame 10, is formed generally rectangular, and includes a mount surface 20 on which the first optical pickup mechanism 14, sub chassis 15 and second optical pickup mechanism 16 are mounted, and an upright peripheral wall 21 along the periphery of the base chassis 12, not including some portions near the corner of the mount surface 20. The mount surface 20 has formed therein first and second openings 22 and 23 in which the pickup bases of the first and second optical pickup mechanisms 14 and 16 are moved. These openings 22 and 23 are formed longitudinally of the mount surface 20, and there is formed nearly at the longitudinal middle of the mount surface 20 a mount 24 on which the spindle motor of the disk rotation drive 13 is disposed.

Note that in the following description, the long-side direction of the base chassis 12 will be referred to as "right-left direction" and the short-side direction of the base chassis 12, perpendicular to the long-side direction be referred to as "front-rear direction". As shown in FIGS. 3 and 4, the first optical pickup mechanism 14 is disposed in the first opening 22 formed in the base chassis 12 at the right side of the latter, and the sub chassis 15 and second optical pickup mechanism 16 are disposed in the second opening 23 formed in the base chassis 12 at the left side of the latter. FIGS. 3 and 4 are perspective views, respectively, from the rear side 12b, of the base chassis 12. As shown in FIG. 1, the base chassis 12 is disposed to have the front side 12a thereof directed toward the front side 2a of the device body 2.

At the right side 12c of the base chassis 12, there is formed a pair of first mounts 29 on which there is installed a first skew adjusting mechanism 80 to make a skew adjustment of the first optical pickup mechanism 14. The first mounts 29 are provided separately from each other in the front-rear direction. Also, the base chassis 12 has damper openings 31 and 32 formed near both corners of the right side 12c of the mount surface 20. In these openings 31 and 32, there are installed damping members which will be described in detail later. The damper openings 31 and 32 are located in a position corresponding to the outer radius of the disk-shaped recording medium 3 mounted on the disk rotation drive 13, and there are installed in the damper openings 31 and 32 outer dampers 141 and 142 which prevent the first optical pickup unit 50 moved to the outer radius of the disk-shaped recording medium 3 from being vibrated.

At the left side 12d of the base chassis 12, there is formed a second mount 30 to which there is installed a second skew adjusting mechanism 130 to make a skew adjustment of the second optical pickup mechanism 16 by adjusting the angle at which the sub chassis 15 as will be described in detail later. The second mount 30 is formed in a position nearer to the rear side 12b of the base chassis 12. Near the second mount 30, there is formed an engagement hole 38 in which a forcing member such as a helical torsion spring, engaged at one end thereof on the sub chassis 15, is engaged at the other end. The sub chassis 15 is always forced toward the base chassis 12 under the action of the forcing member. Also, the base chassis 12 has damper openings 33 and 34 formed therein near both the corners at the left side 12d of the mount surface 20. In these damper openings 33 and 34, there are installed damping members which will be described in detail later. The damper openings 33 and 34 are also located in positions corresponding to the outer radius of the disk-shaped recording medium 3 placed on the disk rotation drive 13, and have installed thereto outer dampers 143 and 144 which prevent vibration of a second optical pickup unit 100 having been moved to the outer radius of the disk-shaped recording medium 3.

The mount 24 formed nearly at the longitudinal middle of the base chassis 12 extends between the first and second openings from the front side 12a to rear side 12b in the front-rear direction of the base chassis 12. The mount 24 has damper openings 35 and 36 formed in the end portions thereof at the front side 12a and rear side 12b of the base chassis 12. In these damper openings 35 and 36, there are installed damping members which will be described in detail later. The damper openings 35 and 36 are located at the inner radius of the disk-shaped recording medium 3 placed on the disk rotation drive 13, and have installed therein inner dampers 145 and 146 to prevent vibration of the first and second optical pickup units 50 and 100 having been moved to the inner radius. Also, the mount 24 has formed nearly at the middle thereof a circular mounting opening 37 through which there is to be mounted a spindle motor 42 which will be described in detail later.

Next, there will be explained the disk rotation drive 13 installed on the mount 24 of the base chassis 12. The disk rotation drive 13 holds and rotates a disk-shaped recording medium 3 inserted into the disk drive 1.

The disk rotation drive 13 includes a disk table 41 on which a disk-shaped recording medium 3 is to be mounted, a spindle motor 42 to spin the disk table 41, and a mount base plate 43 having the spindle motor 42 mounted thereon and which is installed to the mount 24. The disk table 41 has formed thereon a disk-shaped disk mount 41a and a centering portion 41b which enters the central hole of the disk-shaped recording medium 3 to center the latter. The spindle motor 42 to spin the disk table 41 is connected at a spindle shaft end (not shown) thereof to the centering portion 41b of the disk table 41. Thus, it is rotatably coupled to the disk table 41. The mount base plate 43 on which the spindle motor 42 is mounted is formed from a rigid plate, and has formed thereon a wiring pattern which transmits control signals for controlling the operation of the spindle motor 41. The mount base plate 43 is disposed nearly at the right-left (longitudinal) middle of the base chassis 12 and screwed to the mount 24. It should be noted that the spindle motor 42 has the lower end thereof inserted in the mounting opening 37 formed in the mount 24.

When the disk-shaped recording medium 3 is chucked to the disk table 41, the disk rotation drive 13 will put the spindle motor 42 into revolution and rotate the disk table 41 and disk-shaped recording medium 3 on the latter as the spindle motor 42 spins.

Next, the first optical pickup mechanism 14 provided at the right side 12c of the base chassis 12 will be explained. The first optical pickup mechanism 14 is used to only read a first disk-shaped recording medium 3a having various content data recorded therein in a first format.

The first optical pickup mechanism 14 includes the first optical pickup unit 50 to read content data from the first disk-shaped recording medium 3a, a pair of guide shafts 60 and 61 to guide the first optical pickup unit 50 in moving, and a pickup moving mechanism 70 that moves the first optical pickup unit 50 along the guide shafts 60 and 61.

The first optical pickup unit 50 includes a rectangular pickup base 51 forming a pickup proper. On the pickup base 51, there are installed at least a light source (not shown) such as a semiconductor laser, an objective lens 52 to focus a light beam emitted from the light source onto the signal recording layer of the disk-shaped recording medium 3, a photodetector (not shown) to detect a return light from the signal recording surface of the disk-shaped recording medium 3, and a drive system to move the objective lens 52 over the disk-shaped recording medium 3 in the focusing and tracking directions. Also, to the pickup base 51 fixed is a cover member 53 having formed therein an opening through which the objective lens 52 is exposed to outside. Also, the first optical pickup mechanism 14 has formed at one longitudinal end 51a of the pickup base 51 an engagement piece 54 which is engaged on the guide shaft 60 as will be described in detail later, and has formed at the other longitudinal end 51b thereof an insertion hole 55 in which the guide shaft 61 is inserted as will be described in detail later. It should be noted that the pickup base 51 has a flexible wiring board on which there are formed a drive circuit to control the drive system for the objective lens 52 and the like.

Also, at the other end 51b of the pickup base 51, there is formed an engagement member 56 which is engaged on a lead screw 71 of the pickup moving mechanism 70, by which the pickup base 51 is moved radially of the disk-shaped recording medium 3. The engagement member 56 has formed thereon an engagement projection 57 which is engaged in threads formed on the lead screw 71. As the lead screw 71 is rotated, the engagement projection 57 is moved in the direction in which the threads are formed, whereby the pickup base 51 is moved along the guide shafts 60 and 61.

The guide shafts 60 and 61 to guide the pickup base 51 in moving are disposed in parallel to each other along the length of the base chassis 12 and over the first opening 22. The guide shafts 60 and 61 are supported at one ends 60a and 61a thereof on bearing members 62 and 63, respectively, provided in the front-rear direction on the mount 24 formed nearly at the longitudinal middle of the base chassis 12, and at the other ends 60b and 61b in bearing recesses 63a and 63b, respectively, in a bearing wall 63 formed on the mount surface 20 at the right side 12c of the base chassis 12. Also, the guide shafts 60 and 61 are engaged at the other ends 60b and 61b, respectively, on a first skew adjusting mechanism 80 which will be described in detail later.

The above guide shaft 60 is engaged on the engagement piece 54 provided at the one end 51a of the pickup base 51, and the guide shaft 61 is inserted into the insertion hole 55 formed in the other end 51b of the pickup base 51, to thereby guide the pickup base 51 in moving radially of the disk-shaped recording medium 3.

The pickup moving mechanism 70 that moves the pickup base 51 along the guide shafts 60 and 61 on which the engagement member 56 of the pickup base 51 is engaged includes the lead screw 71 engaged on the engagement member 56 of the pickup base 51, and a screw motor 72 to rotate the lead screw 71. The lead screw 71 is supported at both free and base ends thereof on a bearing plate 73. Also, the lead screw 71 and screw motor 72 are introduced into the first opening 22 and fixed at the rear side 12b of the base chassis 12 with the bearing plate 73 being screwed to the base chassis 12.

The engagement projection 57 formed on the engagement member 56 of the pickup base 51 is engaged in the threads formed on the body of the lead screw 71. The pickup moving mechanism 70 feeds the engagement member 56 in the direction in which the threads are formed by appropriately rotating the lead screw 71 in forward or reverse, to thereby move the pickup base 51 to the inner or outer radius of the disk-shaped recording medium 3.

Figure 5:
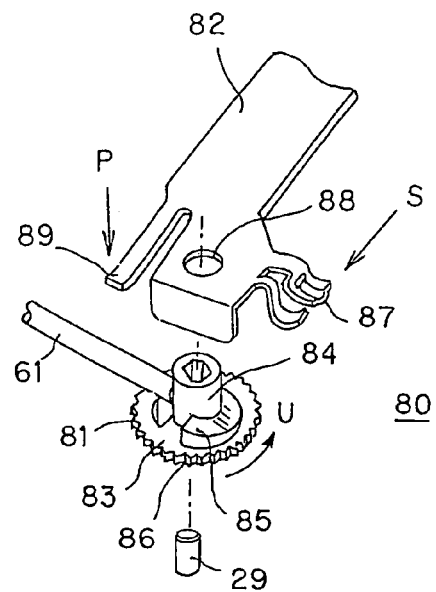
FIG. 5 is an exploded perspective view of the first skew adjustment mechanism.

Next, the first skew adjusting mechanism 80 to make a skew adjustment of the first optical pickup unit 50 will be explained. The first skew adjusting mechanism 80 is installed to the first mounts 29 formed separately from each other in the front-rear direction at the right side 12c of the mount surface 20 and correspondingly to the pair of guide shafts 60 and 61. As shown in FIG. 5, the first skew adjusting mechanism 80 includes lifting cams 81 having other ends 60b and 61b of the guide shafts 60 and 61 mounted on a slope thereof. As the lifting cams 81 are rotated, the other ends 60b and 61b are slid up or down on the slope. The first skew adjusting mechanism 80 includes also a control plate 82 to press the other ends 60b and 61b to the slope and control the rotation of the lifting cams 81.

As shown in FIG. 5, the lifting cams 81 has formed thereon a generally disk-shaped rotating portion 83, an upright shaft portion 84 provided at the center of the rotating portion 83, and a slope portion 85 formed to enclose the base end of the shaft portion 84. The disk-like rotating portion 83 has formed along the perimeter thereof engagement grooves 86 in which a detent projection 87 of the control plate 82 is engaged. It should be noted that FIG. 5 shows the lifting cams 81 and control plate 82, provided to move up or down the guide shaft 61 provided at the rear side 12b of the base chassis 12.

With the detent projections 87 of the control plate 82 being engaged in the engagement grooves 86, the lifting cams 81 are restricted from being rotated. The upright shaft 84 provided at the center of the rotating portion 83 is a hollow cylinder in which the first mount 29 formed at the right side 12c of the base chassis 12 is rotatably inserted from below. Therefore, the lifting cams 81 are rotated about the first mount 29 in the direction of arrow U or in a direction opposite to the arrow-U direction as in FIG. 5. Also, the shaft 84 is open at the top thereof in the form of a polygon, and rotated with a skew adjusting jig (not shown) being engaged in the polygonal opening. The slope portion 85 formed to enclose the base end of the upright shaft 84 rises from a portion of the rotary portion 83 and gradually descends along the perimeter of the upright shaft 84. It is rotated along with the rotating portion 83. Also, the control plate 82 presses the other ends 60b and 61b of the guide shafts 60 and 61 to the corresponding slope portions 85 as will be described in detail later. Therefore, when the rotating portion 83 of each lifting cams 81 is rotated as the shaft 84 is turned with the skew adjusting jig, each of the other ends 60b and 61b of the guide shafts 60 and 61 and the corresponding slope portion 85 will relatively slide on each other, and thus the inclination of each of the guide shafts 60 and 61 will be adjusted. More specifically, when the rotating portion 83 of the lifting cam 81 is rotated in the direction of arrow U in FIG. 5, the other end 61b of the guide shaft 61 is elevated. When the rotating portion 83 is rotated in the direction opposite to the U-arrow direction in FIG. 5, the other end 61b of the guide shaft 61 is lowered. Thus, the inclination of the guide shaft 61 is adjusted. The guide shaft 60 is also elevated and lowered similarly to that of the guide shaft 61.

The control plate 82 is formed generally rectangular to press the other ends 60b and 61b of the guide shafts 60 and 61 to the slope portions of the lifting cams 81. It includes the detent projections 87 provided at the opposite longitudinal ends thereof to restrict the lifting cams 81 from being rotated, openings 88 through which the shaft 84 is exposed at the top thereof to outside, and pressing pieces 89 to press the guide shafts 60 and 61 to the corresponding slope portions 85 of the lifting cams 81, respectively.

The detent projection 87 is forced in the direction of arrow S as in FIG. 5 and engaged in the engagement groove 86 formed in the rotating portion 83 of the lifting cam 81 to restrict the lifting cam from being rotated. When the lifting cam 81 is rotated by the skew adjusting jig, the detent projection 87 will sequentially be engaged in the engagement grooves 86 while being elastically displaced in the direction opposite to the direction of arrow S in FIG. 5.

The top of the shaft 84 of the lifting cam 81 is exposed to outside through the opening 88 and thus the skew adjusting jig is engaged on the shaft 84 through the opening 88, whereby the lifting cam 81 is rotated.

The pressing pieces 89 are forced in the direction of arrow P in FIG. 5 to press the other ends 60b and 61b of the guide shafts 60 and 61 to the slope portion 85 of the lifting cam 81. Thus the pressing pieces 89 have the guide shafts 60 and 61 and the slope portion 85 slide relatively on each other as the lifting cam 81 is rotated. Thus, the guide shafts 60 and 61 will have the other ends 60b and 61b thereof elevated correspondingly to the rotation of the lifting cam 81.

The aforementioned first skew adjusting mechanism 80 makes a skew adjustment of the first optical pickup unit 50 during production, or at shipment, of the disk drive 1. More specifically, when the disk table 41 having mounted thereon the first disk-shaped recording medium 3a having data as a sample recorded in the first format is put into rotation, a laser beam emitted from a light emitting element installed on the first optical pickup unit 50 is reflected at the signal recording surface of the first disk-shaped recording medium 3a and detected by a photodetector provided to detect a return light from the disk-shaped recording medium. The laser beam detected by the photodetector is supplied to a differential amplifier in which it will undergo differential amplification to provide a skew error signal whose level will vary correspondingly to an inclination of the optical axis of the laser beam. Then, in the first skew adjusting mechanism 80, the skew adjusting jig is engaged on the shaft 84 of the lifting cam 81 to rotate the rotating portion 83 of the lifting cam 81 in the direction of arrow U or in the direction opposite to the U-arrow direction in FIG. 5 for the skew error signal to have a minimum value.

As the lifting cam 81 is rotated, any or both of the guide shafts 60 and 61 slides on the slope portion 85 of the lifting cam 81 to have the other ends 60b and 61b thereof elevated or lowered, whereby the inclination of the guide shafts 60 and 61 will be adjusted. Thus, the first optical pickup unit 50 supported on the guide shafts 60 and 61 will have a skew adjusted.

Note here that the first optical pickup unit 50 is provided to only read the first disk-shaped recording medium 3a having various content data recorded therein in the first format and not to write or read any data to or from the second disk-shaped recording medium 3b having data recorded therein in the second format as will be described in detail later. Therefore, the first optical pickup unit 50 is not required for any high-accuracy skew adjustment which is to be done for writing data to the disk-shaped recording medium 3. Namely, it will not undergo any skew adjustment after a coarse skew adjustment is done by the first skew adjusting mechanism 80 during production, or at shipment, of the disk drive 1.

Next, there will be explained the sub chassis 15 disposed over the second opening 23 formed at the left side of the base chassis 12 and having the second optical pickup mechanism 16 provided thereon. The sub chassis 15 supports the second optical pickup mechanism 16 and has the inclination thereof adjusted by the second skew adjusting mechanism 130 provided on the base chassis 12 to make a high-accuracy skew adjustment of the second optical pickup mechanism 16.

As shown in FIG. 4, the sub chassis 15 is formed generally rectangular. It includes a main surface 90 and a pickup opening 91 formed in the main surface 90 correspondingly to the moving range of the second optical pickup unit 16.

The main surface 90 has a damper opening 92 formed therein correspondingly to the damper opening 36 formed in the peripheral corner portion at the rear side 12b. The damper member is exposed upward through the damper opening 92. Also, the sub chassis 15 has a peripheral wall 93 formed along the periphery thereof except for the front-rear-directional nearly middle portions of the main surface 90. At the front and rear sides 93a and 93b of the peripheral wall 93, there are formed rotation supports 94 as the center of rotation of the sub chassis 15 whose inclination is adjusted by the second skew adjusting mechanism 130 as will be described in detail later. Each of the rotation supports 94 has an insertion hole 94a formed therein. The rotation supports 94 are rotatably coupled to the peripheral walls 21, respectively, of the base chassis 12 with the insertion holes 94a being aligned with coupling holes 25 formed in the peripheral wall 21 at the front and rear sides 12a and 12b of the base chassis 12 and with a screw or the like being inserted in each pair of the insertion holes 94a and coupling holes 25.

The above pickup opening 91 is an area in which the second optical pickup mechanism 16 is moved radially of the disk-shaped recording medium 3 as will be described in detail later. It is open (as indicated with a reference 97) at the right edge 91a thereof. When the sub chassis 15 is placed on the base chassis 12, the disk table 41 and spindle motor 42 of the disk rotation drive 13 will be positioned in the open end 97. Also, a coupling member 95 is provided over the pickup opening 91 in a position near the right edge 91a of the latter to extend in the front-rear direction. Further, the pickup opening 91 has formed near the left edge 91c thereof a motor opening 91b in which there is disposed a spindle motor 122 of a second pickup moving mechanism 120 that moves the second optical pickup mechanism 16. The coupling member 95 extends over the open end 97 of the pickup opening 91 to assure an increased rigidity of the sub chassis 15 and a sufficient rigidity of the whole base chassis 12. The coupling member 95 has base ends 95a and a main portion 95b extending in the front-rear direction between the base ends 95a. Since the base ends 95a are inclined toward the base chassis 12, so the main portion 95b extends below the second opening 23 in the base chassis 12, that is, it extends not on the moving orbit of the second optical pickup mechanism 16.

Also, the sub chassis 15 has provided thereon near the left edge 91c of the pickup opening 91a skew adjusting shaft 96 projecting from the base chassis 12 downward and whose inclination is to be adjusted by the second skew adjusting mechanism 130. The skew adjusting shaft 96 slides at the lower end thereof on a skew adjusting cam 131 of the second skew adjusting mechanism 130 so as to be elevated or lowered, thereby adjusting the inclination of the sub chassis 15. Also, near the skew adjusting shaft 96, there is formed an engagement hole 99 in which there is hooked one end of a forcing member 98 such as a helical torsion spring hooked at the other end thereof in the engagement hole 38 in the base chassis 12. Thus, the sub chassis 15 is always forced by the forcing member 98 toward the base chassis 12.

Next, the second optical pickup mechanism 16 disposed on the sub chassis 15 will be explained. The second optical pickup mechanism 16 is used to write or read content data to or from the second disk-shaped recording medium 3b having various content data recorded therein in the second format.

The second optical pickup mechanism 16 includes the second optical pickup unit 100 to write or read content data to or from the second disk-shaped recording medium 3b, a pair of guide shafts 110 and 111 to guide the second optical pickup unit 100 in moving, and a pickup moving mechanism 120 that moves the second optical pickup unit 100 along the guide shafts 110 and 111.

The second optical pickup unit 100 includes a generally rectangular pickup base 101 as a pickup proper. On the pickup base 101, there are disposed at least a light source (not shown) such as a semiconductor laser, an objective lens 102 to converge and focus a light beam emitted from the light source onto the signal recording surface of the disk-shaped recording medium 3, a photodetector (not shown) to detect a return light from the signal recording surface of the disk-shaped recording medium 3, a drive system to move the objective lens 102 in the focusing and tracking directions over the disk-shaped recording medium 3, and a skew sensor 108 to detect a skew of the second optical pickup unit 100. Also, the second optical pickup mechanism 16 has formed at one longitudinal end 101a of the pickup base 101 an engagement piece 104 which is engaged on the guide shaft 110 as will be described in detail later, and has also formed at the other longitudinal end 101b an insertion hole 105 in which the guide shaft 111 is inserted as will be described in detail later. It should be noted that the pickup base 101 has mounted thereon a flexible wiring board on which a drive circuit to control the drive system for the objective lens 102, and the like.

Also, the pickup base 101 has provided at the other end 101b thereof a rack member 106 which is in mesh with a gear mechanism 121 of the pickup moving mechanism 120 that moves the pickup base 101 radially of the disk-shaped recording medium 3. When the gear mechanism 121 is rotated, the pickup base 101 is moved along with the rack member 106 along the guide shafts 110 and 111.

The guide shafts 110 and 111 to guide the pickup base 101 in moving are disposed in parallel to each other longitudinally of the base chassis 12 to extend over the second opening 23 in the base chassis 12 and pickup opening 91 in the sub chassis 15. Also, the guide shafts 110 and 111 are supported at the one ends 110a and 111a thereof on bearing members 112 and 113 provided separately from each other in the front-rear direction on the main surface 90 in positions near the open end 97 of the pickup opening 91 and at the other ends 110b and 111b thereof on bearing members 114 and 115 formed on the main surface 90 at the left edge 91c of the pickup opening 91.

The above guide shaft 110 is engaged on the engagement piece 104 provided at the one end 101a of the pickup base 101, and the guide shaft 111 is inserted in the insertion hole 105 formed in the other end 101b of the pickup base 101, to thereby guide the pickup base 101 in moving radially of the disk-shaped recording medium 3.

The pickup moving mechanism 120 includes the gear mechanism 121 which is to be in mesh with the rack member 106 of the pickup base 101, and a feed motor 122 that rotates the gear mechanism 121. With the rack member 106 being in mesh with the gear mechanism 121, the pickup moving mechanism 120 moves the pickup base 101 along the guide shafts 110 and 111. The gear mechanism 121 and feed motor 122 are screwed to the mount surface 20 of the base chassis 12 or main surface 90 of the sub chassis 15, and thus fixed to the front side 12a of the second opening 23 in the base chassis 12.

As mentioned above, the rack member 106 formed integrally on the pickup base 101 is in mesh with the gear mechanism 121. With the gear mechanism 121 being appropriately rotated by the feed motor 122 in forward or reverse to move the rack member 106 in the right-left direction, the pickup moving mechanism 120 moves the pickup base 101 to the inner or outer radius of the disk-shaped recording medium 3.

Figure 6:
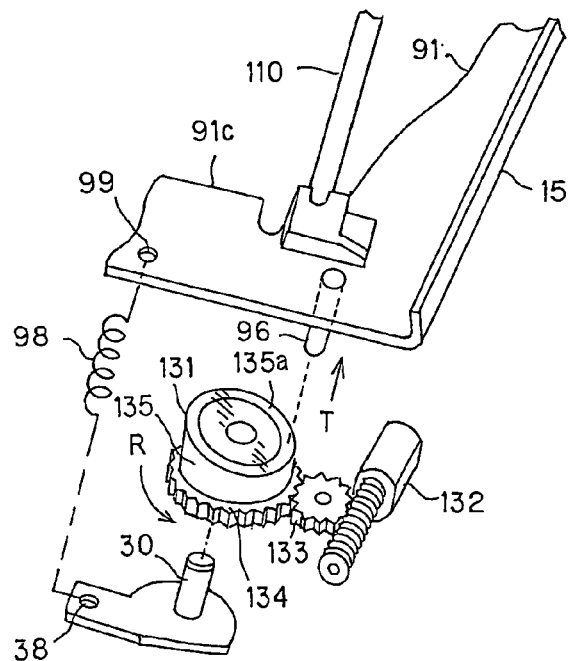
FIG. 6 is an exploded perspective view of the second skew adjustment mechanism.

Next, there will be explained the second skew adjusting mechanism 130 that makes a skew adjustment of the second optical pickup unit 100. The second skew adjusting mechanism 130 is fixed to the second mount 30 provided at the left side 12d of the base chassis 12 in a position nearer to the rear side 12b. As shown in FIG. 6, the second skew adjusting mechanism 130 includes the skew adjusting cam 131 that adjusts an inclination of the sub chassis 15 by sliding the free end of the skew adjusting shaft 96 of the sub chassis 15 relatively on a slope portion of the skew adjusting cam 131, a skew adjusting motor 132 to rotate the skew adjusting cam 131, and a gear mechanism 133 to convey the rotation of the skew adjusting motor 132 to the skew adjusting cam 131.

As shown in FIG. 6, the skew adjusting cam 131 includes a generally disk-shaped rotating portion 134, and an obliquely-truncated conical portion 135 formed upright along the periphery the rotating portion 134. The generally disk-shaped rotating portion 134 has formed on the periphery thereof an engagement portion 136 on which the gear mechanism 133 is engaged. Therefore, a rotation of the skew adjusting motor 132 is conveyed to the rotating portion 134 via the gear mechanism 133 engaged on the engagement portion 136 to rotate the rotating portion 134. Also, the rotating portion 134 has formed at the center thereof an insertion hole (not shown) in which the second mount 30 of the base chassis 12 is inserted, and thus it is supported rotatably on the base chassis 12.

Also, the obliquely-truncated conical portion 135 is formed along the periphery of the rotating portion 134 as above, and has an inclined surface 135a formed on the top thereof. The skew adjusting shaft 96 provided on the bottom of the sub chassis 15 to project downward toward the base chassis 12 will abut the inclined surface 135a. This inclined surface 135a gradually descends toward the periphery of the rotating portion 134. As the rotating portion 134 is rotated, the obliquely-truncated conical portion 135 is rotated along with the rotating portion 134. Also, as the sub chassis 15 is forced by the forcing member 98 toward the base chassis 12, the skew adjusting shaft 96 is pressed at the free end thereof to the inclined surface 135a of the obliquely-truncated conical portion 135. Therefore, as the rotating portion 134 of the skew adjusting cam 131 is rotated by the skew adjusting motor 132 via the gear mechanism 133, the skew adjusting shaft 96 slides relatively on the inclined surface 135a to elevate or lower the sub chassis 15. More specifically, the rotating portion 134 of the skew adjusting cam 131 is rotated in the direction of arrow R in FIG. 6, the skew adjusting shaft 96 slides up on the inclined surface 135a to tilt the sub chassis 15 in the direction of arrow T in FIG. 6. When the rotating portion 134 is rotated in a direction opposite to the direction of arrow R in FIG. 6, the skew adjusting shaft 96 slides down on the inclined surface 135a to tilt the sub chassis 15 in a direction opposite to the direction of arrow T in FIG. 6.

The aforementioned second skew adjusting mechanism 130 makes a skew adjustment of the second optical pickup unit 100 which is writing or reading content data to or from the disk-shaped recording medium 3b inserted in the disk drive 1. More particularly, infrared light emitted from the skew sensor 108 installed in the second optical pickup unit 100 is reflected at the signal reflecting surface of the second disk-shaped recording medium 3b and the reflected light is detected by the skew sensor 108. The skew sensor 108 supplies the differential amplifier with an output corresponding to an inclination of the signal recording surface of the second disk-shaped recording medium 3b. The output from the skew sensor 108 undergoes differential amplification in the differential amplifier to provide a skew error signal whose level varies depending upon the inclination of the laser beam. The skew adjusting motor 132 is driven by a servo circuit 163 for the skew error signal to have a minimum value, and the skew adjusting cam 131 is rotated by means of the gear mechanism 133 in the direction of arrow R or in a direction opposite to the direction of arrow R as in FIG. 6.

As the skew adjusting cam 131 is rotated, the skew adjusting shaft 96 is sled up or down on the inclined surface 135a of the obliquely-truncated conical portion 135. Thus, an inclination, in relation to the base chassis 12, of the sub chassis 15 having the skew adjusting shaft 96 projecting downward is adjusted, and thus a skew of the second optical pickup unit 100 of the second optical pickup mechanism 16 disposed on the sub chassis 15 is adjusted.

Note here that the second optical pickup unit 100 is intended to write or read content data to or from the second disk-shaped recording medium 3b having various content data recorded therein in the second format as mentioned above. Also, the physical format including the track pitch, pit size, etc. on the signal recording surface of a DVD included in the second disk-shaped recording media 3b is smaller than that in a CD, whereby the allowance for the optical-axis inclination of the laser beam projected onto the signal recording surface is strictly limited. Further, if the optical axis of a light beam emitted from the second optical pickup unit 100 is not perpendicular but oblique to the signal recording surface of the second disk-shaped recording medium 3b to which content data is going to be written, an aberration will take place so that the light means will form a spot, not circular but elliptic, on the signal recording surface. In this case, no correct data recording is possible. On this account, the second optical pickup unit 100 is designed so that an inclination of the optical axis of a laser beam can be real-time detected with a high accuracy during write to or read from the second disk-shaped recording medium 3b, and any skew of the second optical pickup unit 100 can be adjusted by the skew adjusting mechanism 130 with a higher accuracy.

Also, the second skew adjusting mechanism 130 makes a skew adjustment of the second optical pickup unit 100 mounted on the sub chassis 15 by adjusting an inclination of the sub chassis 15. As mentioned above, the second optical pickup unit 100 will have a skew thereof real-time adjusted while writing to or reading from the second disk-shaped recording medium 3b. If the guide shafts 110 and 111 are directly driven as in the first optical pickup unit 50, the bearing members 112 to 115 will be so abraded due to frequent sliding contact with the guide shafts 110 and 111 that it will possibly be difficult to assure any stable skew adjustment. Also, if a mechanically strong material is used to form the guide shafts 110 and 111 and bearing members 112 to 115 in order to prevent them from being damaged, it will lead to a larger size and weight of the optical pickup mechanism. Further, if the skew adjusting means is assembled to the pickup base 101 of the second optical pickup unit 100 in order to make a skew adjustment, the second optical pickup unit 100 will be heavier and hence cannot have the skew thereof adjusted stably.

On the other hand, in the disk drive 1 according to the present invention, the sub chassis 15 is supported on the upright peripheral wall 21 to be rotatable about the rotation support 94 and the inclination of the sub chassis 15 is adjusted with the rotation support 94 being taken as a fulcrum. Therefore, also in case a real-time skew adjustment is done by the second skew adjusting mechanism 130, the sub chassis 15, guide shafts 110 and 111 and bearing members 112 to 115 will not be damaged due to any frequent adjustment of the sub chassis inclination and a stable skew adjustment can be done without any increased load to the second optical pickup unit 100.

Figure 7:
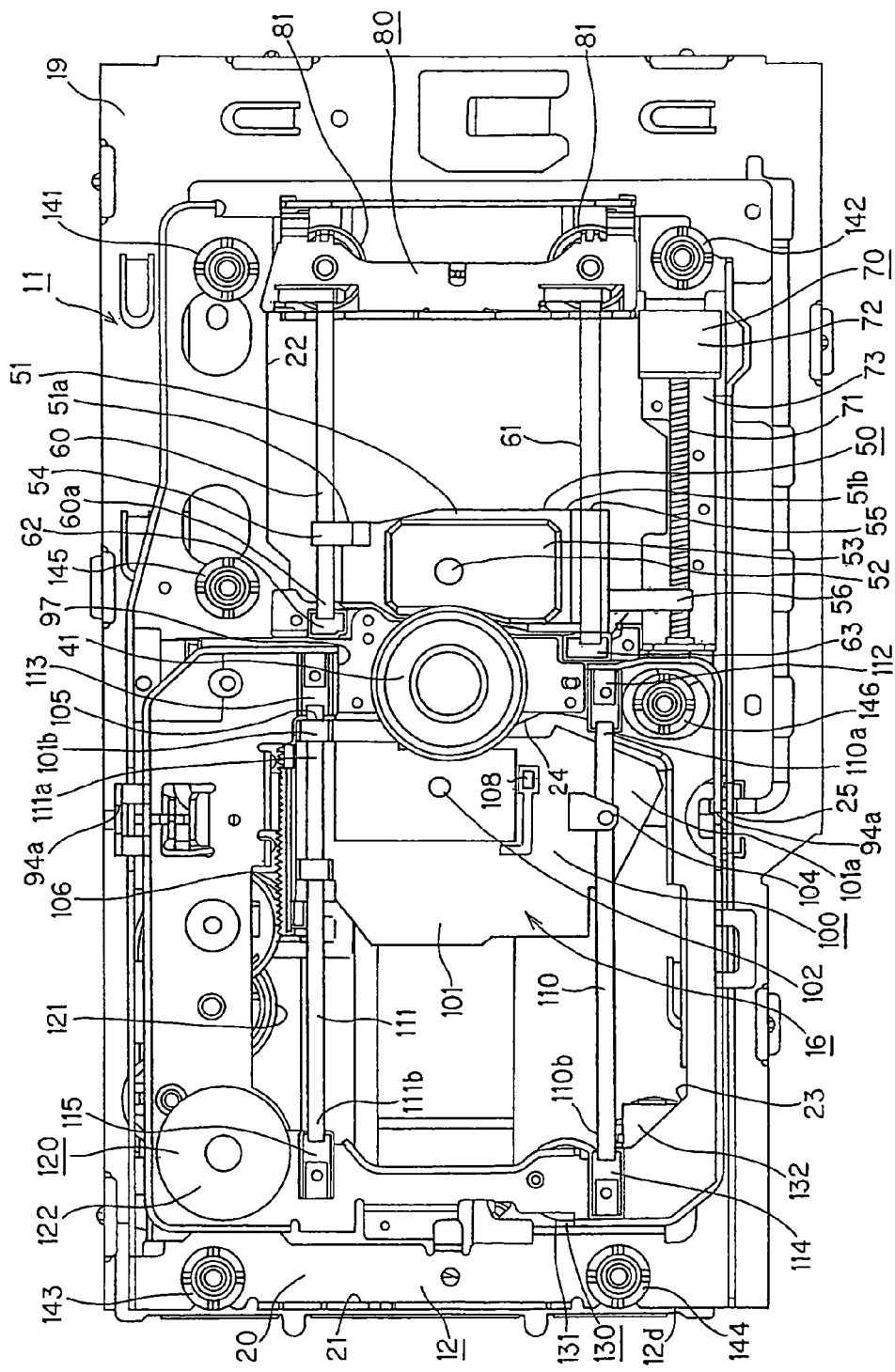
FIG. 7 is a plan view of the write/read mechanism with both the first and second optical pickup units having been moved to the inner radius of a disk-shaped recording medium.

As shown in FIG. 7, the write/read mechanism 11 of the disk drive 1 constructed as above has installed on the base chassis 12 the disk rotation drive 13, first optical pickup mechanism 14 and the sub chassis 15 on which the second optical pickup mechanism 16 is installed. Thus, the first optical pickup unit 50 disposed at the right side of the base chassis 12, and second optical pickup unit 100 disposed on the sub chassis 15 provided at the left side of the base chassis 12, are supported on the pair of guide shafts 60 and 61 and pair of guide shafts 110 and 111, respectively, to be symmetrical in the right-left direction.

Namely, the engagement piece 54 at the one end 51a of the pickup base 51 is engaged on the guide shaft 60, and the guide shaft 61 is inserted in the insertion hole 55 at the other end 51b. Thus, the first optical pickup unit 50 is supported on the guide shafts 60 and 61 at three points thereof including the engagement piece 54 and opposite ends of the insertion hole 55. On the other hand, the engagement piece 104 formed at the one end 101a of the pickup base 101 is engaged on the guide shaft 110, and the guide shafts 111 is inserted in the insertion hole 105 formed in the other end 101b, for the second optical pickup unit 100 to be symmetrical with the first optical pickup unit 50. Thus, the second optical pickup unit 100 is supported on the guide shafts 110 and 111 at three points thereof including the engagement piece 104 and opposite ends of the insertion hole 105.

Thus, the write/read mechanism 11 including the first and second optical pickup units 50 and 100 has the weight thereof balanced taking, as the center of balancing, the disk rotation drive 13 disposed nearly at the center of the base chassis 12. Therefore, since the weight of the write/read unit 4 is thus balanced, the disk drive 1 can stably write or read content data to or from the disk-shaped recording medium 3.

Also, the base chassis 12 of the write/read mechanism 11 has the damper openings 31 to 36 formed near both corners of the right and left sides 12c and 12d at the front-rear-directional ends of the mount 24, and the outer dampers 141 to 144 and inner dampers 145 and 146, such as rubber bushes or the like, installed in the respective damper openings 31 to 36, as shown in FIG. 7.

Figure 8:
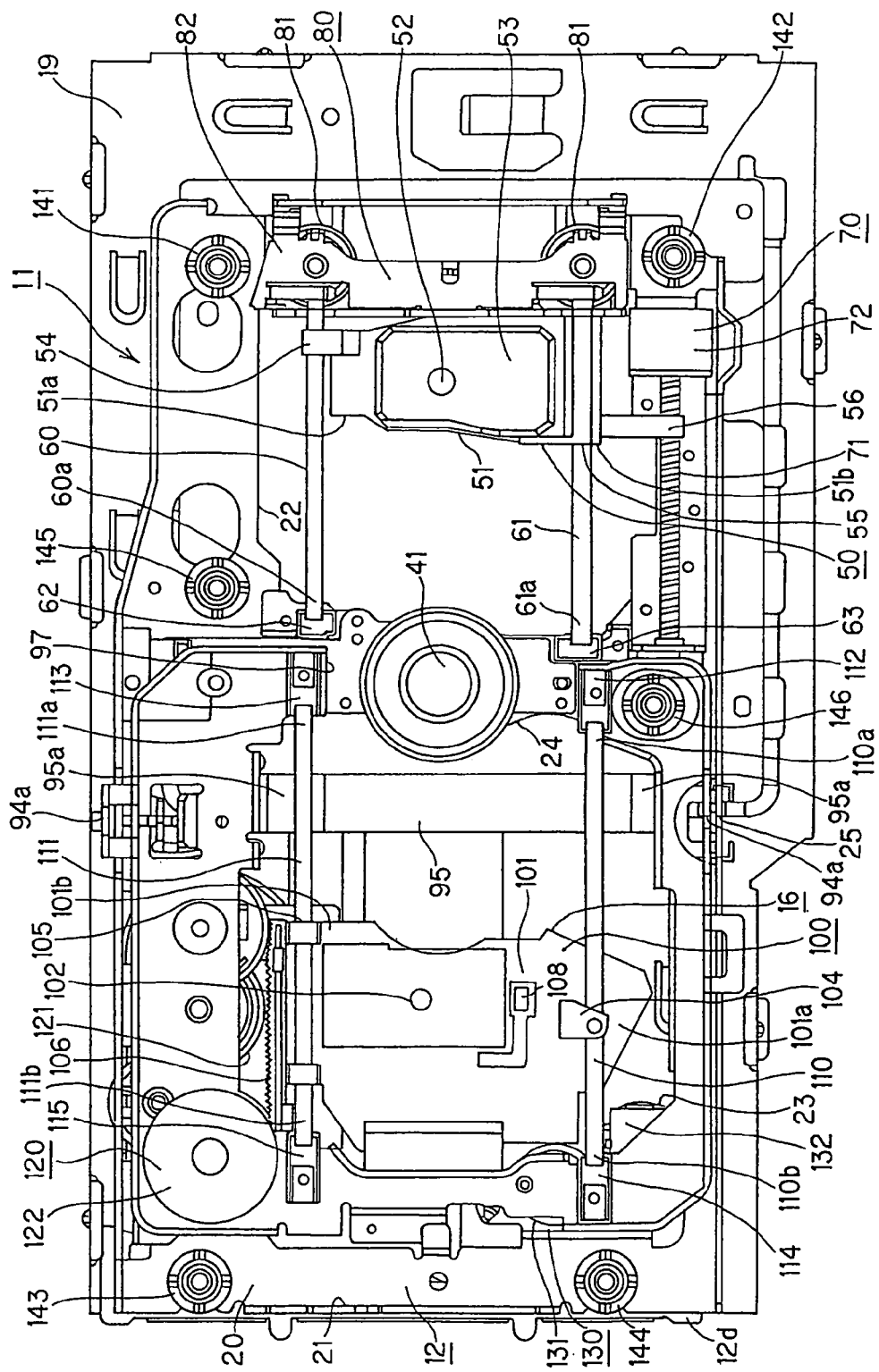
FIG. 8 is a plan view of the write/read mechanism with both the first and second optical pickup units having been moved to the outer radius of the disk-shaped recording medium.

Of the above dampers, the outer ones 141 and 142 and inner ones 145 and 146 are disposed to surround the moving range of the first optical pickup unit 50. More particularly, the first optical pickup unit 50 is moved between the inner and outer radii of the disk-shaped recording medium 3 placed on the disk rotation drive 13 and it will be surrounded by the outer dampers 141 and 142 and inner dampers 145 and 146 in any place within the above moving range, as shown in FIGS. 7 and 8. When the first optical pickup unit 50 is moved to the inner radius toward the spindle motor 42 as a source of vibration, it will be surrounded along with the spindle motor 42 as the vibration source by the outer dampers 141 and 142 and inner dampers 145 and 146. Thus, these dampers will damp the vibration of the spindle motor 42 more effectively. Also, when the first optical pickup unit 50 is moved to the outer radius away from the spindle motor 42 as the vibration source, it will be surrounded by at least three of the pair of outer dampers 141 and 142 and the inner damper 145 or 146, so that the influence of the vibration of the spindle motor 42 can be suppressed.

Similarly, the outer dampers 143 and 144 and inner dampers 145 and 146 are disposed to surround the moving range of the second optical pickup unit 100. More specifically, the second optical pickup unit 100 is moved between the inner and outer radii of the disk-shaped recording medium 3 placed on the disk rotation drive 13 and it will be surrounded by the outer dampers 143 and 144 and inner dampers 145 and 146 in any place within the above moving range, as shown in FIGS. 7 and 8. When the second optical pickup unit 100 is moved to the inner radius toward the spindle motor 42 as a source of vibration, it will be surrounded along with the spindle motor 42 as the vibration source by the outer dampers 143 and 144 and inner dampers 145 and 146. Thus, these dampers will damp the vibration of the spindle motor 42 more effectively. Also, when the second optical pickup unit 100 is moved to the outer radius away from the spindle motor 42 as the vibration source, it will be surrounded by at least three of the pair of outer dampers 143 and 144 and the inner damper 145 or 146, so that the influence of the vibration of the spindle motor 42 can be suppressed.

As above, the first and second optical pickup units 50 and 100 have their moving ranges surrounded by the pair of outer dampers 141 and 142 or 143 and 144 provided in positions corresponding to the outer radius of the disk-shaped recording medium 3 as well as by the pair of inner dampers 145 and 146 provided in positions corresponding to the inner radius of the disk-shaped recording medium 3. Therefore, even if the optical pickup unit is moved to any place between the inner and outer radii of the disk-shaped recording medium 3, it is possible to prevent write or read of content data to or from the disk-shaped recording medium from being influenced by the vibration of the spindle motor 42 as the vibration source.

Also, when the first or second optical pickup unit 50 or 100 is moved to the inner radius of the disk-shaped recording medium, it will be surrounded along with the spindle motor 42 as the source of vibration by the four dampers including the pair of inner dampers 145 and 146 and outer dampers 141 and 142 or 143 and 144, whereby it can effectively be prevented from being influenced by the vibration.

Also, when the first or second optical pickup unit 50 or 100 is moved to the outer radius of the disk-shaped recording medium, it will be surrounded by at least three dampers including the pair of outer dampers 141 and 142 or 143 and 144 and inner dampers 145 or 146, whereby it can positively be isolated from the vibration of the spindle motor 42.

The disk drive 1 constructed as above functions as will be described below. Before the disk-shaped recording medium 3 is introduced into the device body 2 of the disk drive 1, both the first and second optical pickup units 50 and 100 of the write/read mechanism 11 are at the inner radius near the disk rotation drive 13 and are waiting for introduction of the disk-shaped recording medium 3.

When the disk-shaped recording medium 3 is introduced from the disk slot 7 formed in the front side 2a of the device body 2, it is carried by the disk carrying mechanism which will not be described in detail herein to the rear side 2b of the device body 2 and loaded onto the disk table 41 of the write/read unit 4 as shown in FIG. 1.

Then, in the disk drive 1 according to the present invention, the write/read unit 4 is disposed with the length thereof being parallel to the front side 2a of the device body 2 and the disk-shaped recording medium 3 introduced from the disk slot 7 is carried in the direction of arrow F or in a direction opposite to the direction of arrow F in FIG. 1, namely, in the front-rear direction of the base chassis 12 of the write/read unit 4. That is, the disk-shaped recording medium 3 is carried in the front-rear direction perpendicular to the length of the base chassis 12 and in which the first and second optical pickup units 50 and 100 are moved. Therefore, compared with a disk drive in which a disk-shaped recording medium is carried longitudinally of the base chassis, namely, in a direction in which the optical pickup unit is moved, the disk drive 1 according to the present invention has only to carry the disk-shaped recording medium 3 over a shorter distance to the disk table 41, and thus can load and unload the disk-shaped recording medium more rapidly. Also, because of the shorter distance over which the disk-shaped recording medium 3 is carried, the disk carrying mechanism can be designed more compact.

When the disk-shaped recording medium 3 is carried by the disk carrying mechanism onto the disk table 41, the type of the disk-shaped recording medium 3 is detected. The disk drive 1 will write or read content data to or from the disk-shaped recording medium 3 in a format corresponding to the detected disk type.

Figure 9:
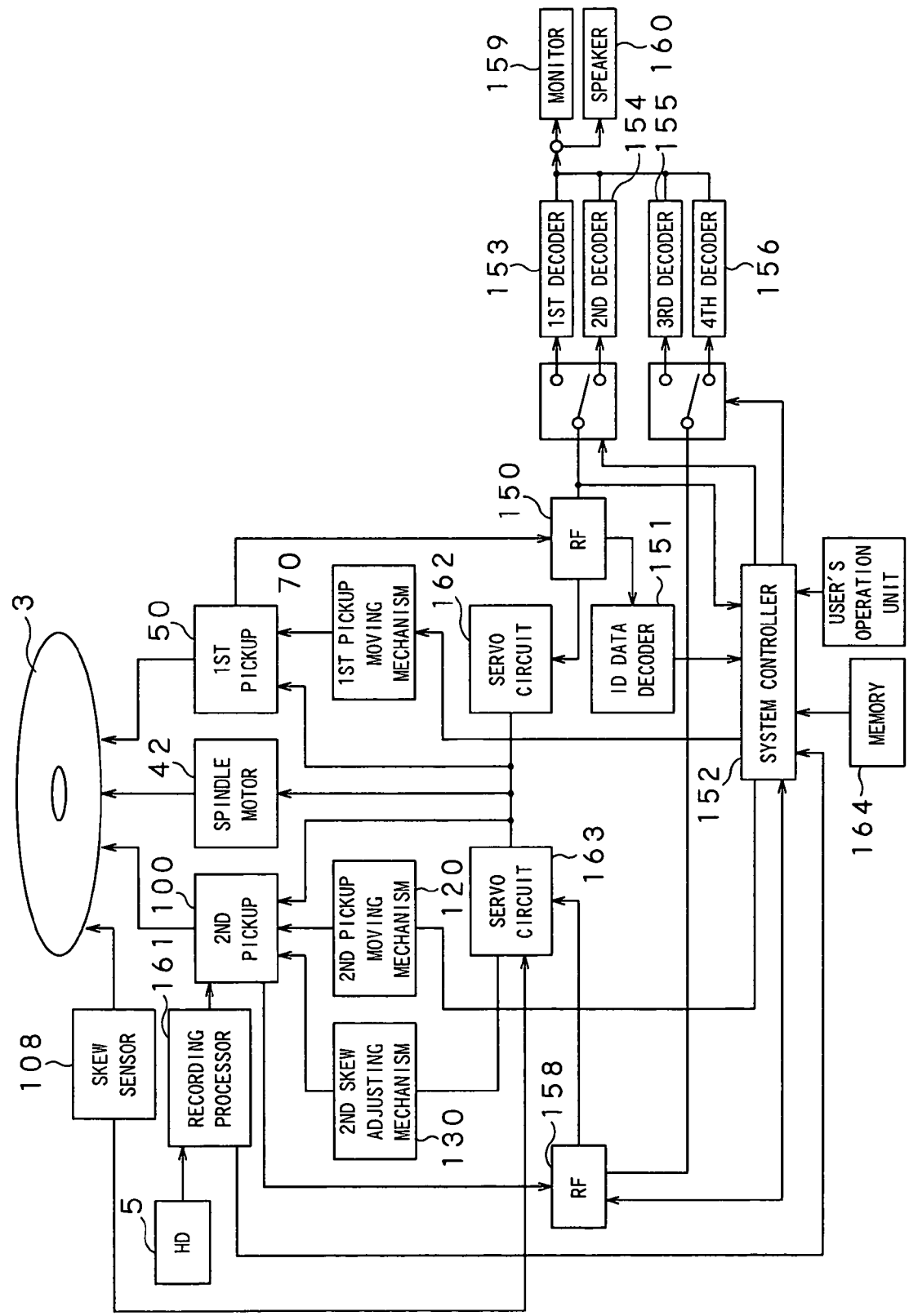
FIG. 9 is a block diagram of the disk drive.

The type of the disk-shaped recording medium 3 is detected by the first optical pickup unit 50. When the disk-shaped recording medium 3 is rotated by the disk rotation drive 13, the first optical pickup unit 50 projects a laser beam emitted from the light emitting element to the signal recording surface of the disk-shaped recording medium 3 and detects a return light from the signal recording surface by the photodetector. The laser light detected by the photodetector is supplied to an identification data decoder 151 via an RF circuit 150, and identification data recorded at a predetermined address on the disk-shaped recording medium 3 is detected (as shown in FIG. 9). Then, a system controller 152 identifies the type of the disk-shaped recording medium 3 mounted on the disk table on the basis of the detected identification data.

Then, the system controller 152 will select the first or second optical pickup unit 50 or 100 correspondingly to the identified type of the disk-shaped recording medium 3. More specifically, when the first disk-shaped recording medium 3a having content data recorded therein in the first format is mounted on the disk table, the first optical pickup unit 50 will be selected. On the other hand, in case the second disk-shaped recording medium 3b having content data recorded therein in the second format is mounted on the disk table, the second optical pickup unit 100 will be selected. Also, the system controller 152 selects one of four decoders 153 to 156 which decode the recorded content data correspondingly to the detected type of the disk-shaped recording medium 3. For example, in case the first disk-shaped recording medium 3a having the content data recorded therein in the first format is detected, the system controller 152 will select either the first or second decoder 153 or 154. Either the first or second decoder 153 or 154 is selected correspondingly to a difference between new and old versions of the reading format. Also, in case the second disk-shaped recording medium 3b having the content data recorded therein in the second format is detected, the system controller 152 will select either the third or fourth decoder. Any of the third and fourth decoders, such as CD write/read decoder and DVD write/read decoder, for example, is selected correspondingly to differences in physical format including the track pitch, pit size, etc. of the disk-shaped recording medium 3 and data format including the modulation method etc. between the first and second disk-shaped recording media. It should be noted that the number of the decoders to be used is appropriately increased or decreased correspondingly to the type of the writing or reading format of the disk-shaped recording medium 3.

In the disk drive 1 according to the present invention, the type of the disk-shaped recording medium 3 mounted on the disk table 41 is detected by the first optical pickup unit 50 as above. As mentioned above, the first optical pickup unit 50 is used to only read data from the first disk-shaped recording medium 3a having content data recorded therein in the first format. Namely, the first optical pickup unit 50 is used less frequently than the second optical pickup unit 100 used to write or read data to or from the second disk-shaped recording medium 3b to which content data is to be recorded in the second format. Therefore, using the first optical pickup unit 50 to detect the type of a disk-shaped recording medium 3 set on the disk table 41, it is possible to reduce the load to the frequently used second optical pickup unit 100 and thus assure a longer service life of the second optical pickup unit 100.

According to the present invention, the disk drive 1 may also be designed to use the second optical disk unit 100 for detection of the type of the disk-shaped recording medium 3 mounted on the disk table. As above, the second optical pickup unit 100 is used to write or read data to or from the second disk-shaped recording medium 3b to which content data is to be recorded in the second format, and in the second optical pickup unit 100, a skew is real-time detected and adjusted and an inclination of the optical axis of the laser beam projected onto the signal recording surface is corrected with a high accuracy in order to focus the laser beam perpendicularly to the signal recording surface in which the track pitch, pit and the like included in the physical format are small.

Therefore, using the second optical pickup unit 100 to detect the type of the disk-shaped recording medium 3 mounted on the disk table 41, it is possible to detect a disk accurately without any error in disk type detection.

When the type of a disk-shaped recording medium 3 is detected, an optical pickup unit corresponding to the detected disk type is selected and the decoders corresponding to the detected disk type is selected, content data will be written to, or read from, the disk-shaped recording medium 3 correspondingly to a user's operation.

Concerning the first optical pickup mechanism 14, it is assumed here that the first disk-shaped recording medium 3a having content data recorded therein in the first format is set on the disk table. In this case, as the lead screw 71 of the pickup moving mechanism 70 is rotated by the screw motor 72 driven with a control signal supplied from the system controller 152, the engagement member 56 being in mesh with the lead screw 71 is moved in the direction in which the threads of the lead screw 71 are formed. Thus, the pickup base 51 of the first optical pickup unit 50 will be moved between the inner and outer radii of the first disk-shaped recording medium 3a, namely, in the direction in which the guide shafts 60 and 61 extend.

Concerning the second optical pickup mechanism 16, it is assumed here that the second disk-shaped recording medium 3b having content data recorded therein in the second format is set on the disk table. In this case, as the gear mechanism 121 of the pickup moving mechanism 120 is rotated by the feed motor 122 driven with a control signal supplied from the system controller 152, the rack member 106 being in mesh with the gear mechanism 121 is moved. Then, the second optical pickup unit 100 connected to the rack member 106 is moved along with the rack member 106 and thus the pickup base 101 is moved between the inner and outer radii of the second disk-shaped recording medium 3b, that is, in the direction in which the guide shafts 110 and 111 extend.

Then, in the first or second optical pickup unit 50 or 100 selected correspondingly to the type of the disk-shaped recording medium 3, a laser beam emitted from the light emitting element and having a predetermined wavelength is guided to the objective lens 52 or 102 via a beam splitter. The objective lens 52 or 102 projects the laser beam onto the signal recording surface of the disk-shaped recording medium 3 and focuses it on a recording track where pits are recorded. Then, the laser beam has the intensity thereof modulated based on the pit state in the recording track and reflected by a reflective layer of the disk-shaped recording medium 3 for being incident back upon the objective lens 52 or 102. The objective lens 52 or 102 allows the return light to pass by for incidence upon the photodetector through the beam splitter. In the disk drive 1, a read output from the photodetector, corresponding to the pit state, is sent to the first to fourth decoders 153 to 156 pre-selected by the RF circuit 150 or 158. After decoded by modulation or otherwise processing in the decoders, the read output is supplied to a monitor 159 and speaker 160 connected to the device body 2 to reproduce the content data.

Also, when writing content data to the disk-shaped recording medium 3, the second optical pickup unit 100 is supplied with a string of to-be-recorded data supplied from the hard disk drive 5 and converted by a recording processor 161 into a predetermined format, and writes the data string to the disk-shaped recording medium 3. The recording processor 161 includes an encoding circuit and modulation circuit. The supplied string of to-be-recorded data has an error correction code added thereto by the encoding circuit, and undergoes 8-14 modulation or 8-16 modulation in the modulation circuit.

While the first or second optical pickup unit 50 or 100 is writing or reading data, a servo circuit 162 or 163 drives the spindle motor 42 until the disk-shaped recording medium 3 arrives at a target velocity of rotation.

The servo circuit 162 or 163 drives a biaxial actuator on the basis of a focus error signal (FE signal) supplied from the RF amplifier 150 or 158 to make focusing servo control for displacing the focal position of the light beam in relation to the disk-shaped recording medium 3. More specifically, the servo circuit 162 or 163 forms a negative feedback servo loop in which the FE signal will be zero, to thereby drive the biaxial actuator. Also, the servo circuit 162 or 163 drives the biaxial actuator on the basis of a tracking error signal (TE signal) supplied from the RF amplifier 150 or 158 to make tracking servo control for moving the position on which the light beam is focused in a direction perpendicular to the recording track of the disk-shaped recording medium 3. More particularly, the servo circuit 162 or 163 forms a negative feedback servo loop in which the TE signal will be zero, to thereby drive the biaxial actuator.

Note here that since the first optical pickup unit 50 has been skew-adjusted during production or at shipment, it can read content data from the first disk-shaped recording medium 3a without any trouble. On the other hand, since the second optical pickup unit 100 has to always correct an inclination of the optical axis in relation to the signal recording surface of the second disk-shaped recording medium 3b to write or read content data to or from the second disk-shaped recording medium 3b, so it makes a real-time skew adjustment during data write or read.

More particularly, in the second optical pickup unit 100, infrared light emitted from the skew sensor 108 is reflected at the signal recording surface of the second disk-shaped recording medium 3b and this reflected infrared light is detected by the skew sensor 108. The skew sensor 108 produces a skew error signal by making differential amplification of the detected infrared light and supplies it to the servo circuit 163. The servo circuit 163 drives the skew adjusting motor 132 of the second skew adjusting mechanism 130 for the skew error signal to have a minimum value.

As above, the disk drive 1 according to the present invention includes the first and second optical pickup units 50 and 100, and the first and second skew adjusting mechanisms 80 and 130 which make a skew adjustment of the first and second optical pickup units 50 and 100, respectively. The first optical pickup unit 50 has been roughly skew-adjusted during production, or at shipment, of the disk drive 1. The second optical pickup unit 100 is real-time skew-adjusted accurately during write to, or read from, the disk-shaped recording medium 3 having content data recorded therein in the second format. Therefore, the two pickup mechanisms and skew adjusting mechanisms are selectively used correspondingly to the type of the disk-shaped recording medium 3 mounted on the disk table, to thereby permit write or read of content data at an appropriate skew angle.

Also, in the disk drive 1 according to the present invention, when one of the optical pickup units is moved between the inner and outer radii of the disk-shaped recording medium 3, the other optical pickup unit is also moved synchronously with the one optical pickup unit, so that the center of the base chassis 12 is always controlled for balance with the spindle motor 42.

Specifically, in the disk drive 1, the system controller 152 detects the distances over which the first and second optical pickup units 50 and 100 have been moved, and controls the pickup moving mechanisms 70 and 120 to move, correspondingly to the detected distance over which the one optical pickup unit has been moved, the other optical pickup unit (see FIG. 9).

More specifically, the system controller 152 is connected to a memory 164 in which there is recorded a table in which the weight of the first and second optical pickup units 50 and 100, distance over which the second optical pickup unit 100 is moved for counterbalance of the base chassis 12 in response to the movement of the first optical pickup unit 50, and distance over which the first optical pickup unit 50 is moved for counterbalance of the base chassis 12 in response to the movement of the second optical pickup unit 100, are correlated with each other. When one of the first and second optical pickup units 50 and 100, selected correspondingly to the type of the disk-shaped recording medium 3 mounted on the disk table 41, is moved by the pickup moving mechanism 70 or 120 between the inner and outer radii of the disk-shaped recording medium 3, the system controller 152 detects the distance over which the selected optical pickup unit has been moved, and controls the motor of the pickup moving mechanism 70 or 120 on the basis of the table recorded in the memory 164 to move the other optical pickup unit to the inner and outer radii of the disk-shaped recording medium 3.

As above, one of the first and second optical pickup units 50 and 100 disposed opposite to the base chassis 12 is moved between the inner and outer radii of the disk-shaped recording medium 3 while the other optical pickup unit is moved between the inner and outer radii of the disk-shaped recording medium 3 synchronously with the one optical pickup unit, so that the movement of the other optical pickup unit will counterbalance a change in weight balance of the base chassis 12, caused by the movement of the one optical pickup unit. Therefore, even if the first or second optical pickup unit 50 or 100 has been moved to any position between the inner and outer radii of the disk-shaped recording medium 3, the center of gravity of the base chassis 12 will not be off the spindle motor 42 as the source of vibration and thus the disk-shaped recording medium 3 can be kept stably rotated without any axial deflection. Also, since the disk-shaped recording medium 3 is thus rotated stably, so the first or second optical pickup unit 50 or 100 can positively write or read content data.

As shown in FIGS. 7 and 8, the engagement piece 54 at the one end 51a of the pickup base 51 is engaged on the guide shaft 60, and the guide shaft 61 is inserted in the insertion hole 55 at the other end 51b. Thus, the first optical pickup unit 50 is supported on the guide shafts 60 and 61 at three points thereof including the engagement piece 54 and opposite ends of the insertion hole 55. On the other hand, the engagement piece 104 formed at the one end 101a of the pickup base 101 is engaged on the guide shaft 110, and the guide shafts 111 is inserted in the insertion hole 105 formed in the other end 101b, in such a manner that the second optical pickup unit 100 and first optical pickup unit 50 will be symmetrical with respect to the disk rotation drive 13. Thus, the second optical pickup unit 100 is supported on the guide shafts 110 and 111 at three points thereof including the engagement piece 104 and opposite ends of the insertion hole 105.

Further, the pickup moving mechanism 70 to move the first optical pickup unit 50 is disposed adjacent to the guide shaft 61 and at the rear side 12b of the base chassis 12. On the other hand, the pickup moving mechanism 120 to move the second optical pickup unit 100 is disposed adjacent to the guide shaft 111 and at the front side 12a of the base chassis 12 to be symmetrical with the pickup moving mechanism 70 with respect to the disk rotation drive 13.

Thus, because of the above arrangement of the first and second optical pickup units 50 and 100, the weight balance of the write/read mechanism 11 is kept about the disk rotation drive 13 disposed nearly at the center of the base chassis 12. Therefore, since the weight of the write/read unit 4 is thus balanced, so the disk drive 1 can make stable write to, or read from, the disk-shaped recording medium 3.

Also, in the disk drive 1 according to the present invention, while the second optical pickup unit 100 is writing content data, the first optical pickup unit 50 verifies whether the second optical pickup unit 100 has successfully written the content data to the disk-shaped recording medium 3.

Since the disk drive 1 includes the second optical pickup unit 100 which is writable and the first optical pickup unit 50 which only reads data and thus the second optical pickup unit 100 can write data while the first optical pickup unit 50 can read data, so it is possible to real-time verify whether content data has successfully been written. Therefore, in the disk drive 1, if a disturbance such as a shock has caused data write to be unsuccessful, it is possible to suspend the writing operation, rapidly detect an address where the writing has been made, and resume the writing.

More specifically, while the second optical pickup unit 100 is writing content data, the first optical pickup unit 50 emits light beam and detects return light from the signal recording surface by the photodetector. The return light detected by the photodetector is supplied to the system controller 152 via the RF circuit 150. The system controller 152 is supplied with data to be written to the disk-shaped recording medium 3 from the recording processor 161. Then, the system controller 152 will compare the to-be-recorded data supplied from the recording processor 161 with recorded data read by the first optical pickup unit 50 at each address. If a write error is found, the system controller 152 will control the second pickup moving mechanism 120 to detect an address where the error has occurred and the second optical pickup unit 100 will resume the writing once suspended.

Note here that in a disk drive including only one optical pickup unit, if there has occurred a failure in write to the signal recording surface of the disk-shaped recording medium 3, it is verified, after all content data have completely been written to the disk-shaped recording medium 3, whether the content data have successfully been written, which will take a long time for the verifying operation, and no rapid resumption of writing will thus be possible. However, the simultaneity between data write by the second optical pickup unit 100 and verification by the first optical pickup unit 50 as in the disk drive 1 according to the present invention makes it possible to rapidly detect any write error and resume the writing once suspended.

Therefore, the disk drive 1 can rapidly write data and resume write to a disk-shaped recording medium 3 to which data can be continuously written time-serially, such as a CD-R, DVD-R or the like.

Also, the first and second optical pickup units 50 and 100 are moved between the inner and outer radii of the disk-shaped recording medium 3 when it is going to write or read, as shown in FIGS. 7 and 8. Since the outer dampers 141 to 144 and inner dampers 145 and 146 are installed at opposite ends, respectively, of the mount 24 formed near the corners and at the longitudinal middle of base chassis 12 and the base chassis 12 is supported on the upper and lower frames 18 and 19 of the base frame 10 via the dampers 141 to 146, so it is possible to effectively isolate the first and second optical pickup units 50 and 100 from the vibration of the spindle motor 42 on the base chassis 12.

More specifically, when the first and second optical pickup units 50 and 100 are moved to the inner radius of the disk-shaped recording medium mounted on the disk table, namely, in a direction in which they are nearer to the spindle motor 42 as the source of vibration, they will be surrounded along with the spindle motor 42 by the outer dampers 141 and 142 or 143 and 144 and inner dampers 145 and 146 and thus it is possible to more effectively isolate the first and second optical pickup units 50 and 100 from the vibration of the spindle motor 42. Also, when the first and second optical pickup units 50 and 100 are moved to the outer radius, that is, in a direction in which they are away from the spindle motor 42, they will be surrounded by at least three dampers including the pair of outer dampers 141 and 142 or 143 and 144 and the inner damper 145 or 146 and thus it is possible to prevent the first and second optical pickup units from being influenced by the vibration of the spindle motor 42.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

Namely, the present invention is not limited to the disk drive 1 having been described in the foregoing but the first optical pickup unit 50, for example, may be designed to write and/or read data. In the above disk device 1, the disk-shaped recording medium 3 is inserted directly into the device body 2, but the present invention is not limited to this design. The disk device 2 may be designed to have a disk tray which is formed movable into and out of the device body 2 so that a disk-shaped recording medium 3 can be placed on the disk tray and carried as it is into the device body 2.

What is claimed is:

1. A disk drive comprising:
a base chassis;
a disk rotation drive including a disk table disposed on the base chassis to hold a disk-shaped recording medium and a spindle motor coupled to the disk table to rotate the disk-shaped recording medium;
a first optical pickup mechanism including a first optical pickup unit disposed on the base chassis to only read information signals recorded in a first disk-shaped recording medium of a first type set on the disk table, and a first pickup moving mechanism that moves the first optical pickup unit in a direction radial to the first disk-shaped recording medium;
a second optical pickup mechanism including a second optical pickup unit disposed opposite to the first optical pickup mechanism to write information signals to and read information signals from a second disk-shaped recording medium of a second type set on the disk table, and a second pickup moving mechanism that moves the second optical pickup unit in a direction radial to the second disk-shaped recording medium;
a skew detecting means for detecting an inclination of an optical axis of light emitted from the second optical pickup unit in relation to the second disk-shaped recording medium; and
a skew adjusting means for adjusting a skew of the second optical pickup unit writing or reading information signals to or from the second disk-shaped recording medium by adjusting an inclination of the second optical pickup unit correspondingly to the optical axis inclination detected by the skew detecting means.

2. The disk drive according to claim 1, wherein:
the base chassis has provided thereon a sub chassis having the second optical pickup mechanism disposed thereon opposite to the first optical pickup mechanism across the disk rotation drive; and
the sub chassis has the inclination thereof adjusted by the skew adjusting means to make a skew adjustment of the second optical pickup unit.

3. The disk drive according to claim 1, further comprising a verifying means for verifying, by the first optical pickup mechanism, when the second optical pickup mechanism is writing information signals to the second disk-shaped recording medium, whether the information signals have successfully been written.

4. The disk drive according to claim 1, wherein the sub chassis has formed therein a movement opening in which the second optical pickup unit is movable in a direction radial to the second disk-shaped recording medium, and has also formed thereon a coupling member to couple opposite ends of the movement opening to each other in a direction perpendicular to a moving direction of the second optical pickup unit.

5. A disk drive comprising:
a base chassis;
a disk rotation drive including a disk table disposed on the base chassis to hold a disk-shaped recording medium and a spindle motor coupled to the disk table to rotate the disk-shaped recording medium;
a first optical pickup mechanism including a first optical pickup unit disposed on the base chassis to read information signals from a first disk-shaped recording medium of a first type set on the disk table, and a first pickup moving mechanism that moves the first optical pickup unit in a direction radial to the first disk-shaped recording medium;
a second optical pickup mechanism including a second optical pickup unit disposed opposite to the first optical pickup mechanism to write information signals to and read information signals from a second disk-shaped recording medium of a second type set on the disk table, and a second pickup moving mechanism that moves the second optical pickup unit in a direction radial to the second disk-shaped recording medium;

a skew detecting means for detecting an inclination of an optical axis of light emitted from the second optical pickup unit in relation to the second disk-shaped recording medium;

a skew adjusting means for adjusting a skew by adjusting an inclination of the second optical pickup unit correspondingly to an inclination of the optical axis, detected by the skew detecting means; and a detecting means for detecting by the second optical pickup unit a type of a disk-shaped recording medium inserted into the disk drive.

6. The disk drive according to claim 5, wherein:

the base chassis has provided thereon a sub chassis having the second optical pickup mechanism disposed thereon opposite to the first optical pickup mechanism across the disk rotation drive; and the sub chassis has an inclination thereof adjusted by the skew adjusting means to make a skew adjustment of the second optical pickup unit.

7. A disk drive comprising:

a base chassis;

a disk rotation drive including a disk table disposed on the base chassis to hold a disk-shaped recording medium and a spindle motor coupled to the disk table to rotate the disk-shaped recording medium;

a first optical pickup mechanism including a first optical pickup unit disposed on the base chassis to read information signals from a first disk-shaped recording medium of a first type set on the disk table, and a first pickup moving mechanism that moves the first optical pickup unit in a direction radial to the first disk-shaped recording medium;

a second optical pickup mechanism including a second optical pickup unit disposed opposite to the first optical pickup mechanism to write information signals to and read information signals from a second disk-shaped recording medium of a second type set on the disk table, and a second pickup moving mechanism that moves the second optical pickup unit in a direction radial to the second disk-shaped recording medium;

a skew detecting means for detecting an inclination of an optical axis of light emitted from the second optical pickup unit in relation to the second disk-shaped recording medium;

a skew adjusting means for adjusting a skew by adjusting an inclination of the second optical pickup unit correspondingly to an inclination of the optical axis, detected by the skew detecting means; and a detecting means for detecting by the first optical pickup unit a type of a disk-shaped recording medium inserted into the disk drive.

8. The disk drive according to claim 7, wherein:

the base chassis has provided thereon a sub chassis having the second optical pickup mechanism disposed thereon opposite to the first optical pickup mechanism across the disk rotation drive;

the sub chassis has an inclination thereof adjusted by the skew adjusting means to make a skew adjustment of the second optical pickup unit.

\* \* \* \* \*